US006977992B2

(12) United States Patent
Zirngibl et al.

(10) Patent No.: US 6,977,992 B2
(45) Date of Patent: *Dec. 20, 2005

(54) SYSTEM AND METHOD FOR THE CREATION AND AUTOMATIC DEPLOYMENT OF PERSONALIZED, DYNAMIC AND INTERACTIVE VOICE SERVICES, WITH REAL-TIME DATABASE QUERIES

(75) Inventors: Michael Zirngibl, Washington, DC (US); Anurag Patnaik, Arlington, VA (US); Bodo Maass, Arlington, VA (US); Christopher S. Leon, Washington, DC (US)

(73) Assignee: MicroStrategy, Incorporated, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/951,475

(22) Filed: Sep. 27, 2004

(65) Prior Publication Data

US 2005/0036593 A1 Feb. 17, 2005

Related U.S. Application Data

(63) Continuation of application No. 09/455,533, filed on Dec. 7, 1999, now Pat. No. 6,798,867.

(60) Provisional application No. 60/153,222, filed on Sep. 13, 1999.

(51) Int. Cl.[7] .......................... H04M 1/64; G06F 15/16
(52) U.S. Cl. ............................. 379/88.17; 379/88.13; 379/88.16; 709/201
(58) Field of Search ........................... 379/67.1, 88.13, 379/88.14, 88.17, 93.25, 69, 70, 71, 74, 76, 379/77, 80, 88.18, 88.22, 93.01; 709/201, 709/202, 206, 217, 1

(56) References Cited

U.S. PATENT DOCUMENTS

| | | | |
|---|---|---|---|
| 4,156,868 A | 5/1979 | Levinson | 704/251 |
| 4,554,418 A | 11/1985 | Toy | 379/88.01 |
| 4,757,525 A | 7/1988 | Matthews et al. | 379/88.26 |
| 4,775,936 A | 10/1988 | Jung | 705/5 |
| 4,785,408 A | 11/1988 | Britton et al. | 704/270 |
| 4,788,643 A | 11/1988 | Trippe et al. | 705/6 |
| 4,811,379 A | 3/1989 | Grandfield | 455/31.3 |
| 4,812,843 A | 3/1989 | Champion, III et al. | 340/7.48 |
| 4,837,798 A | 6/1989 | Cohen et al. | 379/88.14 |
| 4,868,866 A | 9/1989 | Williams, Jr. | 707/9 |

(Continued)

FOREIGN PATENT DOCUMENTS

EP 0878948 11/1998 .......... H04M 7/00

(Continued)

OTHER PUBLICATIONS

MSTR156—Kylänpää, Markku, "Mobile Multimedia White Paper", http://www.vtt.fi/tte/projects/mobmulti/mobmulti.html, last modified Oct. 12, 1998, 8 pages.

(Continued)

*Primary Examiner*—Ovidio Escalante
(74) *Attorney, Agent, or Firm*—Pillsbury Winthrop Shaw Pittman LLP

(57) ABSTRACT

A method and system for accomplishing real-time queries in conjunction with interactive, real-time, voice transmission of information to a user is disclosed. A voice-based communication between a user and a first system is established and a report is transmitted to the user. The report might comprise information and at least one request for user input based on said information. In response to the report, the user can request that additional queries be run against database or other data repository. The requested is drawn from the database automatically, in real-time by connecting to the database.

36 Claims, 15 Drawing Sheets

U.S. PATENT DOCUMENTS

| | | |
|---|---|---|
| 4,931,932 A | 6/1990 | Dalnekoff et al. ............. 705/5 |
| 4,941,168 A | 7/1990 | Kelly, Jr. ..................... 379/69 |
| 4,942,616 A | 7/1990 | Linstroth et al. ........... 704/275 |
| 4,953,085 A | 8/1990 | Atkins ......................... 705/36 |
| 4,972,504 A | 11/1990 | Daniel, Jr. et al. ............ 705/10 |
| 4,974,252 A | 11/1990 | Osborne .................. 379/92.01 |
| 4,989,141 A | 1/1991 | Lyons et al. ................... 705/36 |
| 5,021,953 A | 6/1991 | Webber et al. ................. 705/6 |
| 5,101,352 A | 3/1992 | Rembert ........................ 705/8 |
| 5,128,861 A | 7/1992 | Kagami et al. ............... 705/10 |
| 5,131,020 A | 7/1992 | Liebesny et al. ...... 379/209.01 |
| 5,168,445 A | 12/1992 | Kawashima et al. .......... 705/10 |
| 5,187,735 A | 2/1993 | Herrero Garcia et al. ....................... 379/88.17 |
| 5,189,608 A | 2/1993 | Lyons et al. ................... 705/30 |
| 5,195,086 A | 3/1993 | Baumgartner et al. ...... 370/264 |
| 5,204,821 A | 4/1993 | Inui et al. ................... 700/106 |
| 5,214,689 A | 5/1993 | O'Sullivan ................ 379/88.1 |
| 5,235,680 A | 8/1993 | Bijnagte ................... 379/93.25 |
| 5,237,499 A | 8/1993 | Garback ........................ 705/5 |
| 5,255,184 A | 10/1993 | Hornick et al. ................ 705/6 |
| 5,270,922 A | 12/1993 | Higgins ........................ 705/37 |
| 5,272,638 A | 12/1993 | Martin et al. ............ 455/456.5 |
| 5,323,452 A | 6/1994 | Dickman et al. ...... 379/201.04 |
| 5,331,546 A | 7/1994 | Webber et al. ................. 705/6 |
| 5,347,632 A | 9/1994 | Filepp et al. ............... 709/202 |
| 5,371,787 A | 12/1994 | Hamilton .................... 379/386 |
| 5,404,400 A | 4/1995 | Hamilton .................... 379/386 |
| 5,406,626 A | 4/1995 | Ryan .......................... 705/51 |
| 5,422,809 A | 6/1995 | Griffin et al. ................... 705/5 |
| 5,444,768 A | 8/1995 | Lemaire et al. ............... 379/68 |
| 5,452,341 A | 9/1995 | Sattar ...................... 379/88.27 |
| 5,457,904 A | 10/1995 | Colvin ........................ 40/119 |
| 5,479,491 A | 12/1995 | Herrero Garcia et al. ....................... 379/88.15 |
| 5,493,606 A | 2/1996 | Osder et al. .............. 379/88.05 |
| 5,500,793 A | 3/1996 | Deming, Jr. et al. .......... 705/10 |
| 5,502,637 A | 3/1996 | Beaulieu et al. .............. 705/36 |
| 5,524,051 A | 6/1996 | Ryan .......................... 380/237 |
| 5,539,808 A | 7/1996 | Inniss et al. ............. 379/88.22 |
| 5,555,403 A | 9/1996 | Cambot et al. ................ 707/4 |
| 5,572,643 A | 11/1996 | Judson .................... 379/88.13 |
| 5,572,644 A | 11/1996 | Liaw et al. ................. 707/531 |
| 5,576,951 A | 11/1996 | Lockwood .................... 705/37 |
| 5,577,165 A | 11/1996 | Takebayashi et al. ........ 704/275 |
| 5,590,181 A | 12/1996 | Hogan et al. .......... 379/114.14 |
| 5,604,528 A | 2/1997 | Edwards et al. ........... 340/5.28 |
| 5,610,910 A | 3/1997 | Focsaneanu et al. ........ 370/351 |
| 5,630,060 A | 5/1997 | Tang et al. .............. 379/88.13 |
| 5,638,424 A | 6/1997 | Denio et al. ............. 379/88.18 |
| 5,638,425 A | 6/1997 | Meador, III et al. .......... 705/36 |
| 5,664,115 A | 9/1997 | Fraser ......................... 705/37 |
| 5,684,992 A | 11/1997 | Abrams et al. ............. 709/314 |
| 5,689,650 A | 11/1997 | McClelland et al. ........ 707/102 |
| 5,692,181 A | 11/1997 | Anand et al. ............... 707/102 |
| 5,701,451 A | 12/1997 | Rogers et al. .................. 707/1 |
| 5,706,442 A | 1/1998 | Anderson et al. ............. 705/27 |
| 5,710,889 A | 1/1998 | Clark et al. ................... 705/36 |
| 5,712,901 A | 1/1998 | Meermans ............... 379/88.14 |
| 5,715,370 A | 2/1998 | Luther et al. ............ 704/270.1 |
| 5,717,923 A | 2/1998 | Dedrick ...................... 707/102 |
| 5,721,827 A | 2/1998 | Logan et al. ............... 709/217 |
| 5,724,410 A | 3/1998 | Parvulescu et al. ...... 379/88.18 |
| 5,724,525 A | 3/1998 | Beyers, II et al. ............ 705/40 |
| 5,732,216 A | 3/1998 | Logan et al. ............... 709/203 |
| 5,732,398 A | 3/1998 | Tagawa ........................ 705/5 |
| 5,737,393 A | 4/1998 | Wolf ........................ 379/88.13 |
| 5,740,429 A | 4/1998 | Wang et al. ............. 707/104.1 |
| 5,740,829 A | 4/1998 | Jacobs et al. ............ 137/15.08 |
| 5,742,775 A | 4/1998 | King ........................... 705/38 |
| 5,748,959 A | 5/1998 | Reynolds ................... 709/106 |
| 5,751,790 A | 5/1998 | Makihata ..................... 379/71 |
| 5,751,806 A | 5/1998 | Ryan .......................... 380/237 |
| 5,754,858 A | 5/1998 | Broman et al. ............. 717/111 |
| 5,754,939 A | 5/1998 | Herz et al. ................. 455/3.04 |
| 5,757,644 A | 5/1998 | Jorgensen et al. ............ 700/83 |
| 5,758,088 A | 5/1998 | Bezaire et al. .............. 709/232 |
| 5,758,351 A | 5/1998 | Gibson et al. ........... 707/104.1 |
| 5,761,432 A | 6/1998 | Bergholm et al. .......... 709/226 |
| 5,764,736 A | 6/1998 | Shachar et al. .......... 379/93.09 |
| 5,765,028 A | 6/1998 | Gladden ...................... 706/25 |
| 5,765,143 A | 6/1998 | Sheldon et al. ............... 705/28 |
| 5,771,172 A | 6/1998 | Yamamoto et al. ........... 705/10 |
| 5,771,276 A | 6/1998 | Wolf ........................ 379/88.16 |
| 5,781,735 A | 7/1998 | Southard .................... 709/224 |
| 5,781,886 A | 7/1998 | Tsujiuchi .................... 204/275 |
| 5,787,151 A | 7/1998 | Nakatsu et al. .......... 379/88.23 |
| 5,787,278 A | 7/1998 | Barton et al. .................. 707/1 |
| H1743 H | 8/1998 | Graves et al. .............. 700/236 |
| 5,790,936 A | 8/1998 | Dinkins ..................... 455/3.05 |
| 5,793,980 A | 8/1998 | Glaser et al. ................ 709/231 |
| 5,794,246 A | 8/1998 | Sankaran et al. ........... 707/101 |
| 5,797,124 A | 8/1998 | Walsh et al. .............. 379/88.04 |
| 5,799,063 A | 8/1998 | Krane ...................... 379/88.17 |
| 5,799,156 A | 8/1998 | Hogan et al. ............... 709/237 |
| 5,802,488 A | 9/1998 | Edatsune .................... 704/231 |
| 5,802,526 A | 9/1998 | Fawcett et al. .......... 379/88.13 |
| 5,806,050 A | 9/1998 | Shinn et al. ................... 705/37 |
| 5,809,415 A | 9/1998 | Rossmann .................. 455/422 |
| 5,809,483 A | 9/1998 | Broka et al. .................. 705/37 |
| 5,812,987 A | 9/1998 | Luskin et al. ................. 705/36 |
| 5,819,220 A | 10/1998 | Sarukkai et al. .......... 704/270.1 |
| 5,819,293 A | 10/1998 | Comer et al. ............... 707/203 |
| 5,822,405 A | 10/1998 | Astarabadi ................ 379/88.04 |
| 5,825,856 A | 10/1998 | Porter et al. ............. 379/93.12 |
| 5,832,451 A | 11/1998 | Flake et al. .................... 705/5 |
| 5,838,252 A | 11/1998 | Kikinis ................... 340/825.44 |
| 5,838,768 A | 11/1998 | Sumar et al. ............. 379/88.14 |
| 5,848,396 A | 12/1998 | Gerace ........................ 705/10 |
| 5,848,397 A | 12/1998 | Marsh et al. ................. 705/14 |
| 5,850,433 A | 12/1998 | Rondeau ................ 379/218.01 |
| 5,852,811 A | 12/1998 | Atkins ......................... 705/36 |
| 5,852,819 A | 12/1998 | Beller ........................... 707/1 |
| 5,854,746 A | 12/1998 | Yamamoto et al. ......... 700/106 |
| 5,857,191 A | 1/1999 | Blackwell, Jr. et al. ........ 707/10 |
| 5,864,605 A | 1/1999 | Keshav .................... 379/88.01 |
| 5,864,827 A | 1/1999 | Wilson ........................ 705/35 |
| 5,864,828 A | 1/1999 | Atkins ......................... 705/36 |
| 5,867,153 A | 2/1999 | Grandcolas et al. ........... 705/39 |
| 5,870,454 A | 2/1999 | Dahlen .................... 379/88.14 |
| 5,870,724 A | 2/1999 | Lawlor et al. ................. 705/42 |
| 5,870,746 A | 2/1999 | Knutson et al. ............. 707/101 |
| 5,872,921 A | 2/1999 | Zahariev et al. ............. 709/203 |
| 5,872,926 A | 2/1999 | Levac et al. ................. 709/206 |
| 5,878,403 A | 3/1999 | DeFrancesco et al. ........ 705/38 |
| 5,880,726 A | 3/1999 | Takiguchi et al. ............. 705/10 |
| 5,884,262 A | 3/1999 | Wise et al. ............... 704/270.1 |
| 5,884,266 A | 3/1999 | Dvorak ..................... 704/270.1 |
| 5,884,285 A | 3/1999 | Atkins ......................... 705/36 |
| 5,884,312 A | 3/1999 | Dustan et al. ................ 707/10 |
| 5,890,140 A | 3/1999 | Clark et al. ................... 705/35 |
| 5,893,079 A | 4/1999 | Cwenar ....................... 705/36 |
| 5,893,905 A | 4/1999 | Main et al. .................. 709/224 |
| 5,907,598 A | 5/1999 | Mandalia et al. ....... 379/100.01 |
| 5,907,837 A | 5/1999 | Ferrel et al. .................... 707/3 |
| 5,911,135 A | 6/1999 | Atkins ......................... 705/36 |
| 5,911,136 A | 6/1999 | Atkins ......................... 705/36 |
| 5,913,195 A | 6/1999 | Weeren et al. .............. 704/270 |
| 5,913,202 A | 6/1999 | Motoyama ................... 705/35 |
| 5,914,878 A | 6/1999 | Yamamoto et al. ......... 700/106 |
| 5,915,001 A | 6/1999 | Uppaluru ................ 379/88.22 |
| 5,915,238 A | 6/1999 | Tjaden ....................... 704/260 |
| 5,918,213 A | 6/1999 | Bernard et al. ............... 705/26 |
| 5,918,217 A | 6/1999 | Maggioncalda et al. ...... 705/36 |

| | | | | | | | |
|---|---|---|---|---|---|---|---|
| 5,918,225 | A | 6/1999 | White et al. ............... 707/3 | 6,167,379 | A | 12/2000 | Dean et al. ............... 705/9 |
| 5,918,232 | A | 6/1999 | Pouschine et al. ....... 707/103 R | 6,167,383 | A | 12/2000 | Henson ............... 705/26 |
| 5,920,848 | A | 7/1999 | Schutzer et al. ............... 705/42 | 6,173,266 | B1 | 1/2001 | Marx et al. ............... 704/270 |
| 5,923,736 | A | 7/1999 | Shachar ............... 379/93.17 | 6,173,310 | B1 | 1/2001 | Yost et al. ............... 709/201 |
| 5,924,068 | A | 7/1999 | Richard et al. ............... 704/260 | 6,173,316 | B1 | 1/2001 | De Boor et al. ............... 709/218 |
| 5,926,789 | A | 7/1999 | Barbara et al. ............... 704/270.1 | 6,178,446 | B1 | 1/2001 | Gerszberg et al. ............... 709/217 |
| 5,931,900 | A | 8/1999 | Notani et al. ............... 709/201 | 6,181,935 | B1 | 1/2001 | Gossman et al. ............... 455/461 |
| 5,931,908 | A | 8/1999 | Gerba et al. ............... 709/219 | 6,182,052 | B1 | 1/2001 | Fulton et al. ............... 705/26 |
| 5,933,816 | A | 8/1999 | Zeanah et al. ............... 705/35 | 6,182,053 | B1 | 1/2001 | Rauber et al. ............... 705/28 |
| 5,940,818 | A | 8/1999 | Malloy et al. ............... 707/2 | 6,182,153 | B1 | 1/2001 | Hollberg et al. ............... 709/315 |
| 5,943,395 | A | 8/1999 | Hansen ............... 379/52 | 6,185,558 | B1 | 2/2001 | Bowman et al. ............... 707/5 |
| 5,943,399 | A | 8/1999 | Bannister et al. ............... 379/88.17 | 6,189,008 | B1 | 2/2001 | Easty et al. ............... 707/10 |
| 5,943,410 | A | 8/1999 | Shaffer et al. ............... 379/213.01 | 6,199,082 | B1 | 3/2001 | Ferrel et al. ............... 707/522 |
| 5,943,677 | A | 8/1999 | Hicks ............... 707/205 | 6,201,948 | B1 | 3/2001 | Cook et al. ............... 434/350 |
| 5,945,989 | A | 8/1999 | Freishtat et al. ............... 345/760 | 6,203,192 | B1 | 3/2001 | Fortman ............... 379/88.14 |
| 5,946,485 | A | 8/1999 | Weeren et al. ............... 717/109 | 6,209,026 | B1 | 3/2001 | Ran et al. ............... 709/218 |
| 5,946,666 | A | 8/1999 | Nevo et al. ............... 705/36 | 6,215,858 | B1 | 4/2001 | Bartholomew et al. ... 379/88.17 |
| 5,946,711 | A | 8/1999 | Donnelly ............... 711/152 | 6,219,643 | B1 | 4/2001 | Cohen et al. ............... 704/257 |
| 5,948,040 | A | 9/1999 | DeLorme et al. ............... 701/201 | 6,223,983 | B1 | 5/2001 | Kjonaas et al. ............... 705/92 |
| 5,950,165 | A | 9/1999 | Shaffer et al. ............... 379/88.17 | 6,233,609 | B1 | 5/2001 | Mittal ............... 709/219 |
| 5,953,392 | A | 9/1999 | Rhie et al. ............... 379/88.13 | 6,236,977 | B1 | 5/2001 | Verba et al. ............... 705/10 |
| 5,953,406 | A | 9/1999 | LaRue et al. ............... 379/265 | 6,240,391 | B1 | 5/2001 | Ball et al. ............... 704/270 |
| 5,956,693 | A | 9/1999 | Geerlings ............... 705/14 | 6,243,092 | B1 | 6/2001 | Okita et al. ............... 345/866 |
| 5,960,437 | A | 9/1999 | Krawchuk et al. ............... 707/102 | 6,243,445 | B1 | 6/2001 | Begeja et al. ............... 379/93.01 |
| 5,963,641 | A | 10/1999 | Crandall et al. ............... 380/2 | 6,246,672 | B1 | 6/2001 | Lumelsky ............... 370/310 |
| 5,970,122 | A | 10/1999 | LaPorta et al. ............... 379/67.1 | 6,246,981 | B1 | 6/2001 | Papineni et al. ............... 704/235 |
| 5,970,124 | A | 10/1999 | Csaszar et al. ............... 379/88.18 | 6,253,146 | B1 | 6/2001 | Hanson et al. ............... 701/202 |
| 5,974,398 | A | 10/1999 | Hanson et al. ............... 705/14 | 6,256,659 | B1 | 7/2001 | McLain, Jr. et al. ............... 709/100 |
| 5,974,406 | A | 10/1999 | Bisdikian et al. ............... 707/1 | 6,260,050 | B1 | 7/2001 | Yost et al. ............... 709/201 |
| 5,974,441 | A | 10/1999 | Rogers et al. ............... 709/200 | 6,263,051 | B1 | 7/2001 | Saylor et al. ............... 379/88.17 |
| 5,978,766 | A | 11/1999 | Luciw ............... 705/1 | 6,269,336 | B1 | 7/2001 | Ladd et al. ............... 704/270 |
| 5,978,796 | A | 11/1999 | Malloy et al. ............... 707/3 | 6,269,393 | B1 | 7/2001 | Yost et al. ............... 709/201 |
| 5,983,184 | A | 11/1999 | Noguchi ............... 704/270 | 6,275,746 | B1 | 8/2001 | Leatherman et al. ............... 700/234 |
| 5,987,586 | A | 11/1999 | Byers ............... 709/234 | 6,279,000 | B1 | 8/2001 | Suda et al. ............... 707/10 |
| 5,991,365 | A | 11/1999 | Pizano et al. ............... 379/88.13 | 6,279,033 | B1 | 8/2001 | Selvarajan et al. ............... 709/217 |
| 5,995,945 | A | 11/1999 | Notani et al. ............... 705/10 | 6,279,038 | B1 | 8/2001 | Hogan et al. ............... 709/224 |
| 5,996,006 | A | 11/1999 | Speicher ............... 709/218 | 6,286,030 | B1 | 9/2001 | Wenig et al. ............... 709/203 |
| 5,999,526 | A | 12/1999 | Garland et al. ............... 379/93.01 | 6,289,352 | B1 | 9/2001 | Proctor ............... 707/102 |
| 6,003,009 | A | 12/1999 | Nishimura ............... 705/5 | 6,292,811 | B1 | 9/2001 | Clancey et al. ............... 707/503 |
| 6,006,225 | A | 12/1999 | Bowman et al. ............... 707/5 | 6,301,590 | B1 | 10/2001 | Siow et al. ............... 707/500 |
| 6,009,383 | A | 12/1999 | Mony ............... 704/200 | 6,304,850 | B1 | 10/2001 | Keller et al. ............... 705/275 |
| 6,009,410 | A | 12/1999 | LeMole et al. ............... 705/14 | 6,313,734 | B1 | 11/2001 | Weiss et al. ............... 340/7.29 |
| 6,011,579 | A | 1/2000 | Newlin ............... 348/15 | 6,314,094 | B1 | 11/2001 | Boys ............... 370/352 |
| 6,011,844 | A | 1/2000 | Uppaluru et al. ............... 379/220.01 | 6,314,402 | B1 | 11/2001 | Monaco et al. ............... 704/275 |
| 6,012,045 | A | 1/2000 | Barzilai et al. ............... 705/37 | 6,314,533 | B1 | 11/2001 | Novik et al. ............... 714/39 |
| 6,012,066 | A | 1/2000 | Discount et al. ............... 707/103 R | 6,317,750 | B1 | 11/2001 | Tortolani et al. ............... 707/103 R |
| 6,012,083 | A | 1/2000 | Savitzky et al. ............... 709/202 | 6,321,190 | B1 | 11/2001 | Bernardes et al. ............... 704/8 |
| 6,014,427 | A | 1/2000 | Hanson et al. ............... 379/67.1 | 6,321,198 | B1 | 11/2001 | Hank et al. ............... 704/270 |
| 6,014,428 | A | 1/2000 | Wolf ............... 379/88.11 | 6,321,221 | B1 | 11/2001 | Bieganski ............... 707/5 |
| 6,014,429 | A | 1/2000 | LaPorta et al. ............... 379/88.15 | 6,327,343 | B1 | 12/2001 | Epstein et al. ............... 379/88.01 |
| 6,016,335 | A | 1/2000 | Lacy et al. ............... 379/67.1 | 6,336,124 | B1 | 1/2002 | Alam et al. ............... 707/523 |
| 6,016,336 | A | 1/2000 | Hanson ............... 379/88.23 | 6,341,271 | B1 | 1/2002 | Salvo et al. ............... 705/28 |
| 6,016,478 | A | 1/2000 | Zhang et al. ............... 705/9 | 6,349,290 | B1 | 2/2002 | Horowitz et al. ............... 705/35 |
| 6,018,710 | A | 1/2000 | Wynblatt et al. ............... 704/260 | 6,360,139 | B1 | 3/2002 | Jacobs ............... 700/232 |
| 6,018,715 | A | 1/2000 | Lynch et al. ............... 705/5 | 6,363,393 | B1 | 3/2002 | Ribitzky ............... 707/102 |
| 6,021,181 | A | 2/2000 | Miner et al. ............... 379/88.23 | 6,366,298 | B1 | 4/2002 | Haitsuka et al. ............... 345/736 |
| 6,021,397 | A | 2/2000 | Jones et al. ............... 705/36 | 6,385,191 | B1 | 5/2002 | Coffman et al. ............... 370/352 |
| 6,023,714 | A | 2/2000 | Hill et al. ............... 707/513 | 6,385,301 | B1 | 5/2002 | Nolting et al. ............... 379/32.01 |
| 6,026,087 | A | 2/2000 | Mirashrafi et al. ............... 370/389 | 6,385,583 | B1 | 5/2002 | Ladd et al. ............... 704/270 |
| 6,029,195 | A | 2/2000 | Herz ............... 725/116 | 6,389,398 | B1 | 5/2002 | Lustgarten et al. ............... 704/275 |
| 6,031,836 | A | 2/2000 | Haserodt ............... 370/389 | 6,397,387 | B1 | 5/2002 | Rosin et al. ............... 725/44 |
| 6,035,336 | A | 3/2000 | Lu et al. ............... 709/232 | 6,400,804 | B1 | 6/2002 | Bilder ............... 379/76 |
| 6,038,561 | A | 3/2000 | Snyder et al. ............... 707/6 | 6,404,858 | B1 | 6/2002 | Farris et al. ............... 379/88.02 |
| 6,044,134 | A | 3/2000 | De La Huerga ............... 379/88.08 | 6,404,877 | B1 | 6/2002 | Bolduc et al. ............... 379/218.01 |
| 6,047,327 | A | 4/2000 | Tso et al. ............... 709/232 | 6,405,171 | B1 | 6/2002 | Kelley ............... 704/270 |
| 6,055,513 | A | 4/2000 | Katz et al. ............... 705/26 | 6,411,685 | B1 | 6/2002 | O'Neal ............... 379/88.14 |
| 6,055,514 | A | 4/2000 | Wren ............... 705/27 | 6,412,012 | B1 | 6/2002 | Bieganski et al. ............... 709/232 |
| 6,058,166 | A | 5/2000 | Osder et al. ............... 379/88.22 | 6,415,269 | B1 | 7/2002 | Dinwoodie ............... 705/37 |
| 6,061,433 | A | 5/2000 | Polcyn et al. ............... 379/93.12 | 6,434,524 | B1 | 8/2002 | Weber ............... 704/257 |
| 6,064,980 | A | 5/2000 | Jacobi et al. ............... 705/26 | 6,438,217 | B1 | 8/2002 | Huna ............... 379/88.14 |
| 6,125,376 | A | 9/2000 | Klarlund et al. ............... 715/513 | 6,442,560 | B1 | 8/2002 | Berger et al. ............... 707/102 |
| 6,144,848 | A | 11/2000 | Walsh et al. ............... 455/919 | 6,442,598 | B1 | 8/2002 | Wright et al. ............... 709/217 |
| 6,163,774 | A | 12/2000 | Lore et al. ............... 707/2 | 6,445,694 | B1 | 9/2002 | Swartz ............... 370/352 |

| | | | | |
|---|---|---|---|---|
| 6,456,699 B1 | 9/2002 | Burg et al. | | 379/88.17 |
| 6,456,974 B1 | 9/2002 | Baker et al. | | 704/270.1 |
| 6,459,774 B1 | 10/2002 | Ball et al. | | 379/67.11 |
| 6,466,654 B1 | 10/2002 | Cooper et al. | | 379/88.01 |
| 6,473,612 B1 | 10/2002 | Cox et al. | | 455/414.2 |
| 6,477,549 B1 | 11/2002 | Hishida et al. | | 715/513 |
| 6,480,842 B1 | 11/2002 | Agassi et al. | | 707/4 |
| 6,482,156 B2 | 11/2002 | Iliff | | 600/300 |
| 6,487,277 B2 | 11/2002 | Beyda et al. | | 379/88.01 |
| 6,487,533 B2 | 11/2002 | Hyde-Thomson et al. | | 704/260 |
| 6,490,564 B1 | 12/2002 | Dodrill et al. | | 704/275 |
| 6,490,593 B2 | 12/2002 | Proctor | | 707/102 |
| 6,493,685 B1 | 12/2002 | Ensel et al. | | 705/40 |
| 6,496,568 B1 | 12/2002 | Nelson | | 379/88.12 |
| 6,501,832 B1 | 12/2002 | Saylor et al. | | 379/88.04 |
| 6,507,817 B1 | 1/2003 | Wolfe et al. | | 704/260 |
| 6,513,019 B2 | 1/2003 | Lewis | | 705/35 |
| 6,539,359 B1 | 3/2003 | Ladd et al. | | 704/275 |
| 6,549,612 B2 | 4/2003 | Gifford et al. | | 379/67.1 |
| 6,567,796 B1 | 5/2003 | Yost et al. | | 707/2 |
| 6,571,281 B1 | 5/2003 | Nickerson | | 709/217 |
| 6,578,000 B1 | 6/2003 | Dodrill et al. | | 704/270 |
| 6,587,547 B1 | 7/2003 | Zirngibl et al. | | 379/88.17 |
| 6,587,822 B2 | 7/2003 | Brown et al. | | 704/275 |
| 6,591,263 B1 | 7/2003 | Becker et al. | | 707/3 |
| 6,594,682 B2 | 7/2003 | Peterson et al. | | 718/102 |
| 6,606,596 B1 | 8/2003 | Zirngibl et al. | | 704/270 |
| 6,658,093 B1 | 12/2003 | Langseth et al. | | 379/88.17 |
| 6,658,432 B1 | 12/2003 | Alavi et al. | | 707/104.1 |
| 6,697,824 B1 | 2/2004 | Bowman-Amuah | | 709/229 |
| 6,697,964 B1 | 2/2004 | Dodrill et al. | | 714/38 |
| 6,741,995 B1 | 5/2004 | Chen et al. | | 707/102 |
| 6,760,412 B1 | 7/2004 | Loucks | | 379/88.13 |
| 6,763,300 B2 | 7/2004 | Jones | | 701/201 |
| 6,765,997 B1 | 7/2004 | Zirngibl et al. | | 379/88.18 |
| 6,768,788 B1 | 7/2004 | Langseth et al. | | 379/67.1 |
| 6,785,592 B1 | 8/2004 | Smith et al. | | 700/291 |
| 6,788,768 B1 | 9/2004 | Saylor et al. | | 379/88.13 |
| 6,798,867 B1 | 9/2004 | Zirngibl et al. | | 379/88.17 |
| 6,829,334 B1 | 12/2004 | Zirngibl et al. | | 379/88.17 |
| 6,836,537 B1 | 12/2004 | Zirngibl et al. | | 379/67.1 |
| 6,850,603 B1 | 2/2005 | Eberle et al. | | 379/88.16 |
| 6,873,693 B1 | 3/2005 | Langseth et al. | | 379/201.02 |
| 6,885,734 B1 | 4/2005 | Eberle et al. | | 379/88.01 |
| 2001/0012335 A1 | 8/2001 | Kaufman et al. | | 379/67.1 |
| 2002/0006126 A1 | 1/2002 | Johnson et al. | | 370/356 |
| 2002/0065752 A1 | 5/2002 | Lewis | | 705/35 |
| 2003/0088872 A1 | 5/2003 | Maissel et al. | | 725/46 |
| 2004/0128514 A1 | 7/2004 | Rhoads | | 713/176 |
| 2004/0133907 A1 | 7/2004 | Rodriguez et al. | | 725/14 |

FOREIGN PATENT DOCUMENTS

| | | | | |
|---|---|---|---|---|
| EP | 0889627 | 1/1999 | | H04M 3/50 |

OTHER PUBLICATIONS

MSTR157—Ewen, Edward F., et al., "Data Warehousing in an Integrated Health System; Building the Business Case", *Proceeding of the ACM First International Workshop on Data Warehousing and OLAP*, 1998, pp. 47-53.

MSTR158—Zaiane, Osmar R., et al., "Discovering Web Access Patterns and Trends by Applying OLAP and Data Mining Technology on Web Logs", *IEEE International Forum on Research and Technology Advances in Digital Libraries*, date unavailable, pp. 19-29.

MSTR159—Kurz, Andreas, et al., "Data Warehousing within Intranet: Prototype of a Web-Based Executive Information System", *Proceedings of the 8th International Workshop on Database and Expert Systems Applications*, 1997, pp. 627-632.

MSTR160—Lehn, Rémi, et al., "Data Warehousing Tool's Architecture: From Multidimensional Analysis to Data Mining", *IEEE Database and Expert Systems Applications*, date unavailable, pp. 636-643.

MSTR161—MicroStrategy: "MicroStrategy Customers Embrace DSS Broadcaster", *Business Wire*, Aug. 11, 1998, 4 pages, Proquest #32763756.

MSTR162—MicroStrategy: "MicroStrategy Introduces DSS StockMarket", *Business Wire*, Jun. 16, 1998, 3 pages, Dialog File 20 #01940188.

MSTR163—Lucent: Gohring, Nancy: "Text-to-Speech Moves Along", *Telephony*, Aug. 24, 1998, v235n8pg56, 3 pages, Proquest #33418136.

MSTR164—Lucent: "Lucent Technologies Unveils Powerful New Speech Software", *Business Wire*, Aug. 24, 1998, 3 pages, Proquest #33311728.

MSTR165—Vergito Delivers an Unprecedented Level of Personalized Webcasting with I-Casting, *Business Wire*, Mar. 10, 1997, 3 pages.

MSTR166—MicroStrategy: MicroStrategy to Launch DSS Broadcaster, *M2 Presswire*, Feb. 27, 1998, 2 pages.

MSTR001—Advertisement for Progressive Telecommunications Corporation's OPUS, date unknown.

MSTR002—KnowledgeX Workgroup Edition Publication, date unknown.

MSTR003—Relational OLAP Server, MicroStrategy; DSS Server Brochure, 1996.

MSTR004—Relational OLAP Interface for the Web, 1996.

MSTR005—"Andyne Introduces Greater Flexibility for Database Queries; New Query Management Option Provides Enhanced Management for Enterprise-Wide Queries," *Business Wire*, Jan. 3, 1996. Available from the Dow Jones Interactive Web Site http://Ptg.djnr.com.

MSTR006—Catalano, Carla, "OLAP, Scheduling, Tuning for DBMSs," *Computer World*, Apr. 1, 1996. Available in Dow Jones Interactive, http://www.dowjonesinteractive.com.

MSTR007—*Andyne's Intranet Strategy Brings DSS to the Web; Company Aims to Dramatically Broaden Scope of Reporting, Online Analysis, PR Newswire*, Sep. 18, 1996. Available from the Dow Jones Interactive Web Site http://Ptg.djnr.com.

MSTR008—Sachs et al., "A First Step on the Path to Automated Flight Reservations," *Interactive Voice Technology for Telecommunications*, 1996.

MSTR009—Bennacef et al., "Dialog in the RAILTEL Telephone-Based System," *Spoken Language*, 1996.

MSTR010—Brooks, Peter, "Targeting Customer," *DBMS*, v9, n13, Dec. 1996, pp. 54-58.

MSTR011—"Sterling Software Announces Alliance with Thinking Machines," *Business Wire*, Dec. 16, 1996. Available from the Dow Jones Interactive Web Site http://Ptg.djnr.com.

MSTR012—Gupta et al., "Index Selection for OLAP," *Proceedings of the 13th International Conference on Data Engineering*, © 1997.

MSTR013—Ho et al., "Partial-Sum Queries in OLAP Data Cubes Using Covering Codes," *PODS'97* Tucson, AZ USA.

MSTR014—Kilmartin et al., "Real Time Stock Price Distribution Utilising the GSM Short Messaging Service," 1997 IEEE International Conference on Personal Wireless, 1997, Abstract.

MSTR015—*Data Warehousing: Data Access and Delivery*, Infobase Technology Database, 1997, http://www.dbaint.com/oldinfobase/dwaccdel.html.

MSTR016—Gardner, Dana Marie, "Cashing in With Data Warehouses and the Web," Data Based Advisor, v15, n2, Feb. 1997, pp. 60-63.

MSTR017—*Intrepid Systems Announces General Availability of DecisionMaster 4.1; Retailing's Premier Decision Support Software Enhancements Automate Information Delivery, Business Wire*, May 27, 1997. Available in Dow Jones Interactive, http://www.dowjonesinteractive.com.

MSTR018—*Blue Isle Software InTouch/2000 Product Overview*, Blue Isle Software, Inc. (archived Jul. 7, 1997), http://www.blueisle.com. Available in Internet Archive Waybackmachine http://www.archive.org.

MSTR019—"*Blue Isle Software Teams with Arbor Software to Deliver Automated Systems Management Capabilities for Arbor Essbase,*" Business Wire, Oct. 29, 1997. Available in LEXIS, Nexis Library, ALLNWS file.

MSTR020—"*Early Warning: Compulogic's Dynamic Query Messenger,*" Software Futures, Nov. 1, 1997. Available in LEXIS, Nexis Library, ALLNWS file.

MSTR021—Kilmartin et al., "Development of an Interactive Voice Response System for a GSM SMS Based Share Price Server," DSP '97 Conference Proceedings, Dec. 1997, Abstract.

MSTR022—Avnur et al., "CONTROL: Continuous Output and Navigation Technology with Refinement On-Line," © 1998.

MSTR023—Liang et al., "*Computing Multidimensional Aggregates in Parallel,*" 1998 International Conference on Parallel and Distributed Systems, IEEE.

MSTR024—Friel et al., *An Automated Stock Price Delivery System Based on the GSM Short Message Service*, ICC'98 1998 IEEE International Conference on Communications, 1998, Abstract.

MSTR025—Microstrategy Products and Services, 1998.

MSTR026—Personalized Information Broadcast Server, 1998.

MSTR027—"*Information Advantage Wins Product of the Year Award for Knowledge Management,*" Business Wire, Mar. 4, 1998. Available in LEXIS, Nexis Library, ALLNWS file.

MSTR028—Emigh, Jacqueline, "*Information Builders, Inc. Launches WebFocus Suit,*" Newbytes, Mar. 10, 1998. Available in Northern Light, http://www.northernlight.com, Doc. ID BS19980311010000172.

MSTR029—*Microstrategy; DSS Broadcaster—The Industry's First Information Broadcast Server, M2 Presswire*, Mar. 20, 1998. Available in Dow Jones Interactive http://www.djinteractive.com.

MSTR030—*Microstrategy Introduces DSS Broadcaster—The Industry's First Information Broadcast Server*, Mar. 23, 1998. http://strategy.com/newsandevent/New/PressRelease/1998/broadcaster.htm.

MSTR031—*Microstrategy Introduces DSS Broadcaster—The Industry's First Information Broadcast Server*, Mar. 23, 1998. http://www.strategy.com/newsandevents/News/PressReleases/1998/broadcaster.htm.

MSTR032—"*MSNBC on the Internet Launches New Traffic Section; MSNBC.com and Sidewalk.com Team with TrafficStation for Production of Comprehensive Site for Drivers*," Financial News, Redmond, Wash., Apr. 15, 1998.

MSTR033—Prospectus—4,000,000 Shares Microstrategy Class A Common Stock, Jun. 11, 1998.

MSTR034—"*System for Telephone Access to Internet Applications—Uses Dial Tones and/or Voice with Interactive Voice Response Unit to Pass Request to Processor that Converts Requests to Communication Protocol Command Set,*" IBM, Patent No. RD 98412088. Jul. 20, 1998, Abstract.

MSTR035—Relational OLAP Interface, Programmer's Reference and SDK Guide, Version 5.0, Aug. 1998.

MSTR036—Data Warehouse Dossier, Fall 1998.

MSTR037—"*Microstrategy Announces Enhanced Versions of DSS Web and DSS Server*," Oct. 26, 1998, http://www.strategy.com/NewsandEvents/news/pressreleases/1998/server5.5.htm.

MSTR038—System Guide DSS Web Version 5.5, Feb. 1999.

MSTR039—Developer Guide DSS Web Version 5.5, Feb. 1999.

MSTR040—Media Output Book, v2.0, Feb. 16, 1999.

MSTR041—*Computer Telephony*, from www.telecomlibrary.com—Sep. 9, 1999.

MSTR042—Frequently Asked Questions About DSS Web, printed Feb. 23, 1999, http://www.strategy.com/products/Web/faq.htm.

MSTR043—"*Traffic Station Extends Service to Six New Markets in North America, Reaching its Goal of 20 Markets by the New Millennium,*" Business Editors/Multimedia & Transportation Writers, Los Angeles, Dec. 23, 1999.

MSTR044—Traffic Station Corporate Information, http://www.trafficstation.com/home/corporate.html, Jan. 10, 2001.

MSTR045—Newswire, "Net Phones to Outsell Laptops by 2002", Dec. 2, 1998, Dialog File #03635692.

MSTR046—RCR Radio Communications Report, "Comverse Developing Unified Applications for GSM Smartphone Marketplace", Feb. 23, 1998, V. 17, No. 8, p. 106, Dialog File #02078693.

MSTR047—America's Network, "Wireless Web Browsing: How Long Will Deployment Take? (There Will be 22 Mil Devices Other than PCs Accessing the Internet by 2000)", Dec. 15, 1996, vol. 100, No. 24, p. 30+, Dialog File #01708089.

MSTR048—Adali et al., "Query Caching and Optimization in Distributed Mediator Systems", SIGMOD '96, Jun. 1996, Montreal, Canada, pp. 137-148.

MSTR049—Alur et al., "Directory-Driven Information Delivery", DataBase Associates Int'l, Jul. 1996, printed from http://web.archive.org on Jan. 7, 2002, 12 pages.

MSTR050—Chawathe et al., "Representing and Querying Changes in Semistructured Data", Proceedings of the 14th International Conference on Data Engineering, IEEE, Feb. 23-27, 1998, pp. 4-13.

MSTR051—Codd et al., "Providing OLAP (On-line Analytical Processing) to User-Analysts; an IT Mandate", San Jose, California, Codd and Date, 1993, 1 page.

MSTR052—Flohr, "Using Web-Based Applications to Perform On-Line Analytical Processing Builds on the Strengths of Both Technologies", *OLAP by Web*, Sep. 1997, 8 pages.

MSTR053—Gesmann et al., "A Remote Cooperation System Supporting Interoperability in Heterogeneous Environments", Proceedings of the Third International Workshop on Research Issued in Data Engineering, IEEE, Apr. 19-20, 1993, pp. 152-160.

MSTR054—Hackathorn, "Solutions to Overworked Networks and Unruly Software Distribution are Just Part of P&S.", *Publish or Perish*, Sep. 1997, 21 pages.

MSTR055—Liscano et al., "Integrating Multi-Modal Messages across Heterogeneous Networks", IEEE, 1997, pp. 45-53, Abstract.

MSTR056—Liu et al., "Differential Evaluation of Continual Queries", Proceedings of the 16th International Conference on Distributed Computing Systems, IEEE, May 27-30, 1996, pp. 458-465.
MSTR057—Newing, "Relational Databases Are Not Suitable for Management Information Systems: And That's Official!", *Management Accounting*, London, vol. 72, No. 8, Sep. 1994, 4 pages.
MSTR058—Raden, "Teraforming the Data Warehouse", Archer Decision Sciences, printed from http://www.archer-decision.com on Jan. 16, 2002, 13 pages.
MSTR059—Schreier et al., Alert: An Architecture for Transforming a Passive DBMS into an Active DBMS, Proceedings of the 17th International Conference on Very Large Data Bases, Sep. 3-6, 1991, pp. 469-478.
MSTR060—Schultz, "ADEPT—The Advanced Database Environment for Planning and Tracking", *Bell Labs Technical Journal*, Jul.-Sep. 1998, pp. 3-9.
MSTR061—Spofford, "Attack of the Killer APIs", Intelligent Enterprise's Database Online Programming and Design, printed from http://www.dbpd.com on Dec. 21, 2001, 10 pages.
MSTR062—Stonebraker et al., "On Rules, Procedures, Caching and Views in Data Base Systems", Proceedings of the 1990 ACM SIGMOD International Conference on Management of Data, May 23-25, 1990, pp. 281-290.
MSTR063—Terry et al., "Continuous Queries over Append-Only Databases", Proceedings of the 1992 ACM SIGMOD International Conference on Management of Data, Jun. 2-5, 1992, pp. 321-330.
MSTR064—Search Results from Internet Archive Wayback Machine, searched for http://www.infoadvan.com, printed from http://web.archive.org on Dec. 19, 2001, 40 pages.
MSTR065—Search Results from Internet Archive Wayback Machine, searched for http://www.platinum.com, printed from http://web.archive.org on Dec. 21, 2001, 17 pages.
MSTR066—ROLAP Case Studies, 30 pages (no earlier than Sep. 1997).
MSTR067—"Fast and Flexible Access to Databases", *Byte*, Aug. 1997, pp. 53-54.
MSTR068—"Distributed Application Development with PowerBuilder 6.0", Manning Publications Co., printed from http://www.manning.com on Jan. 15, 2002, 12 pages.
MSTR069—"PowerBuilder 6.0 Questions & Answers", Manning Publications Co., printed from http://www.manning.com on Jan. 15, 2002, 13 pages.
MSTR070—"PowerBuilder 6.0 Questions & Answers", Manning Publications Co., printed from http://www.manning.com on Jan. 17, 2002, 2 pages.
MSTR071—Cheshire, "Product News—A Sea of Opportunity", Intelligent Enterprise's Database Online Programming and Design, printed from http://www.dbpd.com on Jan. 17, 2002, 6 pages.
MSTR072—"Information Advantage—Business Intelligence", "Live Information Repository . . . ", printed from http://www.infoadvan.com, on Dec. 19, 2001, 5 pages.
MSTR073—"Objective Data Inc.—Computer Software Consultants", Client List, printed from http://objectivedata.com/clients.htm on Jan. 15, 2002, 5 pages.
MSTR074—"Online Analytical Processing", printed from http://searchdatabase.techtarget.com on Jan. 18, 2002, 3 pages.
MSTR075—"Seagate Crystal Reports 8", printed from http://www.crystaluser.com on Dec. 28, 2001, 6 pages.
MSTR076—"Andyne Delivers Personal OLAP with PaBLO 4.0", Press Release, Mar. 31, 1997, Andyne Computing Limited, 5 pages.
MSTR077—"Andyne Announces Support for Microsoft's OLE DB for OLAP", Press Release, Sep. 10, 1997, Andyne Computing Limited, 4 pages.
MSTR078—"Andyne QMO—Manage Data Access", Andyne Computing, printed from http://web.archive.org on Jan. 3, 2002, 5 pages.
MSTR079—"The Andyne Vision—On the Road to the Integrated Solution", Andyne Computing, printed from http://web.archive.org on Jan. 3, 2002, 11 pages.
MSTR080—"Visual Information Access for Multidimensional Companies . . . ", Andyne Corporate Profile, 2 pages, © 1996.
MSTR081—"MicroStrategy Announces DSS Web 5.0; DSS Web Introduces the Web-Cast of Decision Support", MicroStrategy, Jan. 5, 1998, printed Dec. 10, 2001, 2 pages.
MSTR082—"MicroStrategy Introduces DSS Web Standard Edition; Web Interface Provides powerful, Easy-to-Use DSS Tool for Mainstream End-User Market", MicroStrategy, Apr. 27, 1998, printed Dec. 10, 2001, 2 pages.
MSTR083—"MicroStrategy Advantages: Proven Multi-Tier Architecture", printed from http://web.archive.org, 4 pages, © 1995.
MSTR084—"MicroStrategy 'Consumerizes' the Data Warehouse with Its New 4.0 Product Line", Press Release, Jun. 24, 1996, MicroStrategy, printed from http://web.archive.org on Dec. 8, 2001, 7 pages.
MSTR085—"MicroStrategy Announces DSS Server 3.0", Press Release, Aug. 8, 1995, MicroStrategy, printed from http://web.archive.org on Dec. 8, 2001, 5 pages.
MSTR086—"MicroStrategy Announces True Relational OLAP Product Line", Press Release, Aug. 8, 1995, MicroStrategy, printed from http://web.archive.org on Dec. 8, 2001, 5 pages.
MSTR087—"DSS Administrator Features Overview", MicroStrategy, No. 05090297, 2 pages, © 1996, 1997.
MSTR088—"DSS Agent Features Overview", MicroStrategy, No. 05100896, 2 pages, © 1996.
MSTR089—"DSS Server Features Overview", MicroStrategy, No. 05140896, 2 pages, © 1996.
MSTR090—"Relational OLAP Interface", DSS Agent, MicroStrategy, 22 pages and 20 pages (no earlier than 1996).
MSTR091—"Relational OLAP Interface for the Web", MicroStrategy DSS Web Brochure, 4 pages, © 1995.
MSTR092—"Data Warehouse and DSS Management Tools", DSS Administrator, MicroStrategy, 16 pages, © 1996, 1997.
MSTR093—"OLE API for Custom Application Development", DSS Objects, MicroStrategy, 4 pages, © 1996.
MSTR094—"Arbor Software OLAP Products", Brochure, Arbor Software, 12 pages, © 1998.
MSTR095—"InfoTrac OneFile", *Database Programming & Design*, vol. 11, No. 7, Jul. 1998, 12 pages.
MSTR096—"Andyne GQL Version 3.3.2 Available Jul. 17th; Featuring Multi-Pass Reporting, Time Governors and Scripting", *Business Wire*, Jun. 26, 1995, Andyne Computing Limited, 4 pages.
MSTR097—"MicroStrategy Announces DSS Server 3.0; Three-Tier Architecture Results in Exceptional Performance and Scalability for DSS Applications", *Business Wire*, Aug. 8, 1995, MicroStrategy, 3 pages.

MSTR098—"Information Advantage Ships DecisionSuite 3.0 Business Analysis Applications for Data Warehouses", *Business Wire*, Nov. 9, 1995, 3 pages.

MSTR099—"Information Advantage Announces WebOLAP; First Structured Content analysis Server for the World Wide Web", *Business Wire*, Feb. 5, 1996, 3 pages.

MSTR100—"Andyne Delivers Second Stage of the Andyne Integrated Solution", *Canada NewsWire*, May 13, 1996, 3 pages.

MSTR101—"Andyne Computing Ltd is Shipping Version 3.3.2 of Its GQL Decision Support System", *CommunicationsWeek*, No. 566, Jul. 17, 1995, p. 16.

MSTR102—"Andyne Computing Introduces New Query Management Option as Companion Product to Andyne's GQL Product", *CommunicationsWeek*, No. 592, Jan. 15, 1996, p. 16.

MSTR103—"Andyne Hopes to Benefit from Current Data Warehousing Hype with GQL Query Language", *Computergram International*, No. 2798, Nov. 22, 1995, 1 page.

MSTR104—"Andyne's GQL Makes It Easier—New Version of Reporting, Analysis Tool Unveiled", *Computer Reseller News*, No. 685, May 27, 1996, p. 79.

MSTR105—"The Right Tools", *Computer Weekly*, Aug. 29, 1996, 4 pages.

MSTR106—"4 OLAP Tools; The Common Thread is that OLAP Tools Drain Too Much Time and Energy Before You Get What You Need", *Computerworld*, Dec. 2, 1996, 4 pages.

MSTR107—"GQL", *Data Management Review (DM Review)*, vol. 6, No. 5, May 1996, p. 47.

MSTR108—"DB2 Today Newsletter", Jun. 1999, 2 pages.

MSTR109—"GQL 3.2", *DBMS*, vol. 8, No. 1, Jan. 1995, 2 pages.

MSTR110—"Everything's Coming Up Warehouse", *DBMS*, Oct. 1, 1995, 3 pages.

MSTR111—"Query, Reporting, and Analysis Tools", *DBMS*, vol. 9, No. 6, Jun. 15, 1996, 14 pages.

MSTR112—Brooks, "MCI Leverages Data Warehouse Technology to Strengthen its Marketing Campaigns", *DBMS*, Dec. 1996, 7 pages.

MSTR113—Dobson, "Data Binding in Dynamic HTML", *DBMS*, Mar. 1998, 12 pages.

MSTR114—Dodd, "Native is as Native Does", *HP Professional*, vol. 12, No. 12, Feb. 1998, 1 page.

MSTR115—"Banking's New Payoff: Speed", *InformationWeek*, Jan. 17, 1994, 3 pages.

MSTR116—"Nailing Down More Query Tools"; *InformationWeek*, vol. 523, Apr. 17, 1995, 7 pages.

MSTR117—Raden, "Data, Data Everywhere", *Information Week*, Oct. 30, 1995, pp. 60-65.

MSTR118—"Back-to-Back Upgrades—Vendors Introduce Reporting, Query Tools", *InformationWeek*, No. 598, Sep. 23, 1996, 1 page.

MSTR119—"Desktop OLAP Tools—If the Tool Fits, Use It—Online Analytical Processing Tools Offer Ease of Use for Data Retrieval and Analysis with Minimal User Training", *InformationWeek*, No. 605, Nov. 11, 1996, 3 pages.

MSTR120—"Pilot Gets Serious About OLAP", *Information Week*, Jul. 20, 1998, pp. 55-59.

MSTR121—"Oracle Announces Next Generation Oracle Express Server 6.0", *M2 Presswire*, Aug. 7, 1996, 5 pages.

MSTR122—"Andyne Updates GQL", *Newsbytes*, Jul. 12, 1994, 1 page.

MSTR123—"Andyne Computing Has Released Version 3. 2.2 of Its GQL Query Software for Macintosh, Windows and Unix Platforms", *Newsbytes News Network*, Jul. 12, 1994, 4 pages.

MSTR124—"Data Access is Key to Warehousing Success", *Open Systems Today*, Oct. 3, 1994, 2 pages.

MSTR125—Phillips, "Crystal Eyes OLAP Engine", *PC Week*, vol. 13, No. 4, Jan. 29, 1996, 3 pages.

MSTR126—Dyck, "New Report Writer Spruces Up GQL", *PC Week*, vol. 14, No. 3, Jan. 20, 1997, 1 page.

MSTR127—"New Decision Suite 3.0 From Information Advantage Raises the Bar for Enterprise Decision Support", *Newswire*, Aug. 8, 1995, 3 pages.

MSTR128—"Andyne's Intranet Strategy Brings DSS to the Web; Company Aims to Dramatically Broaden Scope of Reporting, Online Analysis", *PR Newswire*, Sep. 18, 1996, 11 pages.

MSTR129—"NCR Adds OLAP Services to Extend and Expand Decision Support Capabilities of Teradata Database", *PR Newswire*, May 28, 1998, 3 pages.

MSTR130—"DecisionSuite 3.5", *SoftBase*, Sep. 12, 1996, 2 pages.

MSTR131—"IBM Acquires ITI's KnowledgeX Technology to Enhance Business Intelligence Solutions", *Software News*, Jul. 23, 1998, 1 page.

MSTR132—"Microstrategy Talks Crystal Balls", *Software Futures*, Apr. 1, 1997, 4 pages.

MSTR133—"Document Agent Administrator's Guide", Revision 3, BusinessObjects, Version 4.0, pp. 1-29, © 1996.

MSTR134—"Document Agent Server Administrator's Guide", Revision 4, BusinessObjects, Version 4.1, pp. 1-33, © 1996, 1997.

MSTR135—"Getting Started with Reports", Revision 2, BusinessObjects, Version 4.0, pp. 1-53, © 1996.

MSTR136—"Getting Started with Reports", Revision 3, BusinessObjects, Version 4.1, pp. 1-53, © 1997.

MSTR137—"User's Guide", Revision 3, BusinessObjects, Version 4.0, pp. 1-251, © 1996.

MSTR138—"User's Guide", Revision 4, BusinessObjects, Version 4.1, pp. 1-287, © 1997.

MSTR139—"United EasyUpdate", United Airlines, printed from http://www.ual.com/page/article/0.1360.1974.00.html, printed Nov. 30, 2002, 4 pages.

MSTR140—General Magic, Inc. website, printed from http://www.genmagic.com, printed Nov. 30, 2002, 16 pages.

MSTR142—Lehner, Wolfgang, "Modeling Large Scale OLAP Scenarios", University of Erlangen-Nuremberg, Dept. of Database Systems, Germany, 1998, pp. 1-15.

MSTR143—"Sybase Announces General Availability of Warehouse Studio", *PR Newswire*, New York, Jun. 23, 1998, two pages.

MSTR144—Schmandt, Chris, "Phoneshell: the Telephone as Computer Terminal", *Proceedings of ACM Multimedia '93*, New York, Aug. 1993, pp. 373-382.

MSTR145—Roy, Deb. K., et al., "NewsComm: A Hand-Held Interface for Interactive Access to Structured Audio", *CHI '96 Conference Proceedings*, Vancouver, Canada, Apr. 1996, pp. 173-180.

MSTR146—Roy, Deb Kumar, "NewsComm: A Hand-Held Device for Interactive Access to Structured Audio", Masters Thesis, *MIT Media Laboratory*, 1995.

MSTR147—Emnett, Keith, et al., "Synthetic News Radio", *IBM Systems Journal*, vol. 39, Nos. 3 & 4, 2000, pp. 646-659.

MSTR148—MicroStrategy: "MicroStrategy Announces the General Availability of DSS Broadcaster", *Business Wire*, Aug. 11, 1998, Proquest #32759243.

MSTR149—Intrepid Systems: "Intrepid Systems to Integrate DSS Broadcaster with Its "DecisionMaster" Decision Support Solution; Non-PC Users Benefit from Receiving High-Impact, Mission Critical Information", *Business Wire*, Aug. 11, 1998, Proquest #32760823.

MSTR150—MicroStrategy: "MicroStrategy's DSS Broadcaster Supports Personal Digital Assistants and Advanced Wireless Data Devices", *Business Wire*, Sep. 8, 1998, Proquest #33719588.

MSTR151—Mills, Mike, "Putting the Internet in Your Hand; Nokia's Phone/Palmtop Computer Offers a Glimpse of the Future", *The Washington Post*, Jun. 29, 1998, Proquest #30839088.

MSTR152—Spyglass Prism Concepts and Applications, 1997, Spyglass, Inc., pp. 1-8.

MSTR153—Spyglass White Paper; Spyglass Product Strategy: Making Devices work with the Web, 1997, Spyglass, Inc., pp. 1-9.

MSTR154—Kane, Margaret, "Microsoft Acquires Hotmail", *ZDNet News*, Dec. 30, 1997, 2 pages.

MSTR155—Emnett, Keith, et al., "Synthetic Audio Newscast", *The MIT Media Laboratory*, alleged date: Dec. 1998, pp. 1-2.

SYSTEM AND METHOD FOR THE CREATION AND AUTOMATIC DEPLOYMENT OF PERSONALIZED, DYNAMIC AND INTERACTIVE VOICE SERVICES, WITH REAL-TIME DATABASE QUERIES

RELATED APPLICATIONS

This application is a continuation of U.S. application Ser. No. 09/455,533, filed 07 Dec. 1999, entitled SYSTEM AND METHOD FOR THE CREATION AND AUTOMATIC DEPLOYMENT OF PERSONALIZED, DYNAMIC AND INTERACTIVE VOICE SERVICES WITH REAL-TIME DATABASE QUERIES," now U.S. Pat. No. 6,798,867, issued 28 Sep. 2004, which claims priority from U.S. Provisional Application Ser. No. 60/153,222, filed 13 Sep. 1999, entitled "SYSTEM AND METHOD FOR THE CREATION AND AUTOMATIC DEPLOYMENT OF PERSONALIZED, DYNAMIC AND INTERACTIVE VOICE SERVICES." This application is also related by subject matter to the following U.S. Patent Applications: U.S. application Ser. No. 09/454,602, filed 07 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES;" U.S. application Ser. No. 10/073,331, filed 13 Feb. 2002, entitled "SYSTEM AND METHOD FOR THE CREATION AND AUTOMATIC DEPLOYMENT OF PERSONALIZED, DYNAMIC AND INTERACTIVE VOICE SERVICES, WITH CLOSED LOOP TRANSACTION PROCESSING," which is a continuation of U.S. application Ser. No. 09/455,525, filed 07 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES, WITH CLOSED LOOP TRANSACTION PROCESSING," now abandoned; U.S. application Ser. No. 10/430,265, filed 07 May 2003, entitled "SYSTEM AND METHOD FOR THE CREATION AND AUTOMATIC DEPLOYMENT OF PERSONALIZED, DYNAMIC AND INTERACTIVE VOICE SERVICES WITH REAL-TIME DRILLING VIA TELEPHONE," which is a continuation of U.S. application Ser. No. 09/455,529, filed 07 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES WITH REAL-TIME DRILLING VIA TELEPHONE," now U.S. Pat. No. 6,587,547, issued 01 Jul. 2003; U.S. application Ser. No. 09/661,188, filed 13 Sep. 2000, entitled "SYSTEM AND METHOD FOR THE CREATION AND AUTOMATIC DEPLOYMENT OF PERSONALIZED, DYNAMIC AND INTERACTIVE VOICE SERVICES INCLUDING MODULE FOR GENERATING AND FORMATTING VOICE SERVICES;" U.S. application Ser. No. 10/072,898, filed 12 Feb. 2002, entitled "SYSTEM AND METHOD FOR THE CREATION AND AUTOMATIC DEPLOYMENT OF PERSONALIZED, DYNAMIC AND INTERACTIVE VOICE SERVICES WITH CUSTOMIZED MESSAGE DEPENDING ON RECIPIENT," which is a continuation of U.S. application Ser. No. 09/455,527, filed 07 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES WITH CUSTOMIZED MESSAGE DEPENDING ON RECIPIENT," now abandoned; U.S. application Ser. No. 09/661,377, filed 13 Sep. 2000, entitled "SYSTEM AND METHOD FOR CREATING VOICE SERVICES FOR INTERACTIVE VOICE BROADCASTING;" U.S. application Ser. No. 09/661,375, filed 13 Sep. 2000, entitled "SYSTEM AND METHOD FOR THE CREATION AND AUTOMATIC DEPLOYMENT OF PERSONALIZED, DYNAMIC AND INTERACTIVE VOICE SERVICES, WITH SYSTEM AND METHOD THAT ENABLE ON-THE-FLY CONTENT AND SPEECH GENERATION;" U.S. application Ser. No. 09/496,357, filed 02 Feb. 2000, entitled "SYSTEM AND METHOD FOR PERSONALIZING INTERACTIVE VOICE BROADCASTS;" U.S. application Ser. No. 09/661,471, filed 13 Sep. 2000, entitled "SYSTEM AND METHOD FOR THE CREATION AND AUTOMATIC DEPLOYMENT OF PERSONALIZED, DYNAMIC AND INTERACTIVE VOICE SERVICES INCLUDING A MARKUP LANGUAGE FOR CREATING VOICE SERVICES," now abandoned; U.S. application Ser. No. 09/454,604, filed 07 Dec. 1999, entitled "SYSTEM AND METHOD FOR VOICE SERVICE BUREAU," now U.S. Pat. No. 6,263,051, issued 17 Jul. 2001; U.S. application Ser. No. 09/496,356, filed 02 Feb. 2000, entitled "SYSTEM AND METHOD FOR THE CREATION AND AUTOMATIC DEPLOYMENT OF PERSONALIZED, DYNAMIC AND INTERACTIVE VOICE SERVICES, WITH TELEPHONE-BASED SERVICE UTILIZATION AND CONTROL;" U.S. application Ser. No. 09/455,523, filed 07 Dec. 1999, entitled "SYSTEM AND METHOD FOR REAL-TIME, PERSONALIZED, DYNAMIC, INTERACTIVE VOICE SERVICES FOR INFORMATION RELATED TO EXISTING TRAVEL SCHEDULE;" U.S. application Ser. No. 09/454,601, filed 07 Dec. 1999, entitled "SYSTEM AND METHOD FOR REAL-TIME, PERSONALIZED, DYNAMIC, INTERACTIVE VOICE SERVICES FOR INVENTORY-RELATED INFORMATION;" U.S. application Ser. No. 09/454,597, filed 07 Dec. 1999, entitled "SYSTEM AND METHOD FOR REAL-TIME, PERSONALIZED, DYNAMIC, INTERACTIVE VOICE SERVICES FOR CORPORATE-ANALYSIS RELATED INFORMATION;" U.S. application Ser. No. 09/455,524, filed 07 Dec. 1999, entitled "SYSTEM AND METHOD FOR REAL-TIME, PERSONALIZED, DYNAMIC, INTERACTIVE VOICE SERVICES FOR INVESTMENT-RELATED INFORMATION;" U.S. application Ser. No. 09/454,603, filed 07 Dec. 1999, entitled "SYSTEM AND METHOD FOR REAL-TIME, PERSONALIZED, DYNAMIC, INTERACTIVE VOICE SERVICES FOR ENTERTAINMENT-RELATED INFORMATION;" U.S. application Ser. No. 09/455,532, filed 07 Dec. 1999, entitled "SYSTEM AND METHOD FOR REAL-TIME, PERSONALIZED, DYNAMIC, INTERACTIVE VOICE SERVICES FOR PROPERTY-RELATED INFORMATION," now U.S. Pat. No. 6,768,788, issued 27 Jul. 2004; U.S. application Ser. No. 09/454,599, filed 07 Dec. 1999, entitled "SYSTEM AND METHOD FOR REAL-TIME, PERSONALIZED, DYNAMIC, INTERACTIVE VOICE SERVICES FOR RETAIL-RELATED INFORMATION;" U.S. application Ser. No. 09/455,530, filed 07 Dec. 1999, entitled "SYSTEM AND METHOD FOR REAL-TIME, PERSONALIZED, DYNAMIC, INTERACTIVE VOICE SERVICES FOR BOOK-RELATED INFORMATION," now U.S. Pat. No. 6,788,768, issued 07 Sep. 2004; U.S. application Ser. No. 10/440,361, filed 19 May 2003, entitled "SYSTEM AND METHOD FOR REAL-TIME, PERSONALIZED DYNAMIC, INTERACTIVE VOICE SERVICES FOR TRAVEL AVAILABILITY INFORMATION," which is a continuation of U.S. application Ser. No. 09/455,526, filed 07 Dec. 1999, entitled "SYSTEM AND METHOD FOR REAL-TIME, PERSONALIZED DYNAMIC, INTERACTIVE VOICE SERVICES FOR TRAVEL AVAILABILITY INFORMATION," now U.S. Pat. No. 6,658,093, issued 02 Dec. 2003; U.S. application Ser. No. 09/661,189, filed 13 Sep. 2000, entitled "SYSTEM AND METHOD FOR VOICE-ENABLED INPUT FOR USE IN THE CREATION AND AUTOMATIC DEPLOYMENT OF PERSONALIZED, DYNAMIC, AND INTERACTIVE VOICE SERVICES;" U.S. application Ser. No. 09/455,534, filed 07 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES, WITH INTEGRATED INBOUND AND OUTBOUND VOICE SERVICES;" U.S. application Ser. No. 09/496,425, filed 02 Feb. 2000, entitled "SYSTEM AND METHOD FOR THE CREATION AND AUTOMATIC DEPLOYMENT OF PERSONALIZED, DYNAMIC AND INTERACTIVE VOICE SERVICES, WITH THE DIRECT DELIVERY OF VOICE SERVICES TO NETWORKED VOICE MASSAGING SYSTEMS," now U.S. Pat. No. 6,765,997, issued 20 Jul. 2004; U.S. application Ser. No. 09/454,598, filed 07 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES, INCLUDING DEPLOYMENT THROUGH DIGITAL SOUND FILES," now U.S. Pat. No. 6,606,596, issued 12 Aug. 2003; U.S. application Ser. No. 09/454,600, filed 07 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES, INCLUDING DEPLOYMENT THROUGH PERSONALIZED BROADCASTS;" and U.S. application Ser. No. 09/661,191, filed 13 Sep. 2000, entitled "SYSTEM AND METHOD FOR THE CREATION AND AUTOMATIC DEPLOYMENT OF PERSONALIZED, DYNAMIC AND INTERACTIVE VOICE SERVICES, WITH REAL-TIME INTERACTIVE VOICE DATABASE QUERIES."

FIELD OF THE INVENTION

This invention relates to a system and method for creation and automatic deployment of personalized, dynamic and interactive voice services, including information derived from on-line analytical processing (OLAP) systems, where the system and method includes the ability to utilize user response to query a database in real-time.

BACKGROUND OF THE INVENTION

Although various user interfaces have been developed to enable users to access the content of data warehouses through server systems, many such systems experience significant drawbacks. All of these systems require that the user connect via a computer system to the server system to initiate reports and view the contents of the reports.

Further, once a report is generated, a user may realize that the report does not contain the information that is needed. In this situation, the user generally has to generate a new query to be made against the database and wait for the results. This is a time consuming way of obtaining necessary information.

These and other drawbacks exist with current OLAP interface systems.

SUMMARY OF THE INVENTION

An object of the invention is to overcome these and other drawbacks in existing systems.

It is another object of the invention to provide a system and method for the creation and automatic deployment of personalized, dynamic and interactive voice services, including information derived from on-line analytical processing (OLAP) systems and other data repositories, where the system and method includes the ability to query a database in real-time based on user responses.

One embodiment of the invention relates to a system and method for creation and automatic deployment of personalized, dynamic and interactive voice services, including information derived from on-line analytical processing (OLAP) systems and other data repositories. The system and method enables the ability to capture user selections to facilitate closed-loop transaction processing and processing of other requests. One aspect of the invention relates to an interactive voice broadcasting system and method that enables analytical reporting and advanced transactional services via the telephone or other voice-enabled terminal device. One advantage of the invention is that a voice service may leverage the power of OLAP or other data repository systems and provide critical information to the user, in a timely fashion, by phone. Another advantage of this method and system is that it provides a user with the opportunity to immediately act upon information received during a interactive voice broadcast, A voice service is created and can have many users subscribed to the voice service. Each user can specify personal preferences for the content and presentation of the contents for a voice service. The specification of the elements of a voice service may be done using a set of interfaces (such as GUIs) that take the form of a voice service wizard.

A voice service includes one or more Dialog elements. Dialog elements may include one or more of Speech elements, Input elements and Error elements. An Input element may include a Prompt element and/or an Option element. An Input element enables the system to request input from the user, capture the input and direct the call flow based on the user's input. An Option element associates a key (e.g., on a telephone touch pad dial) with a destination Dialog that is executed when that number is pressed by a user during an interactive voice broadcast. A Prompt requests a user to enter numeric or other information. An Input element may enable a user to request, during an interactive voice broadcast, a transaction, a service or other requests. The term transactions, services and requests are to be interpreted broadly.

According to one embodiment, the user's responses to Input elements are stored during an interactive voice broadcast and, during or after the voice broadcast, the stored information is processed by the system or is passed to another system or application for processing. The transaction (or other request) processing can be accomplished either in real-time, during the voice broadcast, or after the interactive voice broadcast is completed. The results or confirmation of a transaction or other request can be provided to the user during the call or subsequently.

Once a voice service is created, the system monitors predetermined conditions to determine when the voice service should be executed. Each voice service is executed when one or more predetermined conditions are met as specified during creation of the voice service. For example, a voice service may be executed according to a predetermined schedule (time-based) or based on a triggering event (e.g. one or more conditions are met based on the output of an OLAP or other report).

When the predetermined condition is satisfied, the voice service is executed. Executing a voice service, includes the steps of generating the content specified by the voice service and the user preferences. Some users may have identical personalization options and, thus, a single call structure may be generated for a group of users with identical personalization options. The content of the voice service includes the information that is to delivered to users of that voice service, and the Input to be requested from the user, among other things. The content may include, for example, static text messages, dynamic content (e.g. text based on information output from an OLAP report, other database or other sources) or blended text (e.g. static text combined with dynamic content).

This and other content are formatted in an Active Voice Page (AVP). An AVP contains the call structure and data. The AVP contains data at various hierarchical levels that are defined by the Dialog elements defined for each voice service. The active voice pages are used to help govern the interaction between the call server and the user during an IVB. According to one embodiment, the content is formatted, into an AVP e.g., using XSL stylesheets so the AVP is in an XML-based language. According to one embodiment, the XML-based language used is a novel language referred to as TML (discussed below). The AVP is sent to a call server along with style properties for each user. The style properties of a user help determine the behavior of the call server during an interactive voice broadcast. A unique AVP is generated for each user scheduled to receive a voice service.

When a user is called by the call server, information is passed through a T-T-S engine and delivered to the user through a voice-enabled terminal device. Preferably, the structure of each call is dynamic, driven by current data values and is personalized based on a user profile established during subscription to a voice service. During a typical interactive voice broadcast, a synthesized, natural sounding voice greets the recipient by name, identifies itself, provides information relevant to the user and enables a user to provide input back to the system.

An IVB is a voice-enabled interaction with a user having a dynamic structure controlled by the AVP for the particular user. The IVB may be delivered using real-time, on-the-fly speech generation. During an IVB, information is exchanged between the call server and a user according to the AVP. The system executes dialogs by reading messages to the user and, eliciting input from the user. For example, the user may press buttons on a telephone touch pad dial to select an option or to provide numeric or alphanumeric input. Each response provided by a user may transfer control of the IVB to a different part of the AVP.

During or after the IVB, the user's responses may be processed by the system or other applications. The AVP may contain pointers to other applications and embedded statements such that when a user exercises an option, the system performs a requested operation and returns the results to the user during the IVB. For example, by exercising an option, a user may request that a real-time database or web query be performed, or that a query be completed through a WAP or OLTP system. When the user selects such an option, control is shifted to a portion of the AVP that contains an embedded SQL statement that is made against a database.

When a user has worked through selected dialogs of the AVP, the IVB is terminated. That is, a user likely will not work through all of the available dialogs during an IVB. Rather, the user's inputs and option selections determine which the available dialogs are encountered during any given IVB.

Other objects and advantages of the present invention will be apparent to one of ordinary skill in the art upon reviewing the detailed description of the present invention.

DETAILED DESCRIPTION OF THE PREFERRED EMBODIMENTS

According to one embodiment of the present invention, a system and method that enable real-time database queries are provided. Although the term "database" is used through this document for simplicity, it should be understood that the application is meant to encompass web queries as well as queries against a WAP, OLTP or any searchable system. An interactive voice broadcast may present the user with a number of options or request information from the user. An option comprises a number of choices from which the user may chose using the telephone keypad. A request for information comprises a prompt for the user to enter a response, for example, a number or a name, using the telephone keypad.

An example may facilitate explanation of the present invention. A user may receive a voice service telecast relating to the user's stock portfolio. The initial information presented to the user may simply state that the value of a user's portfolio has either increased or decreased. The telecast, however, may also present the user with an option to check the value of any specific stock. The system may list individual stocks as options and ask the user to choose, or the system may simply prompt the user to enter a ticker symbol through which the symbol will identify the desired stock.

Figure 9:
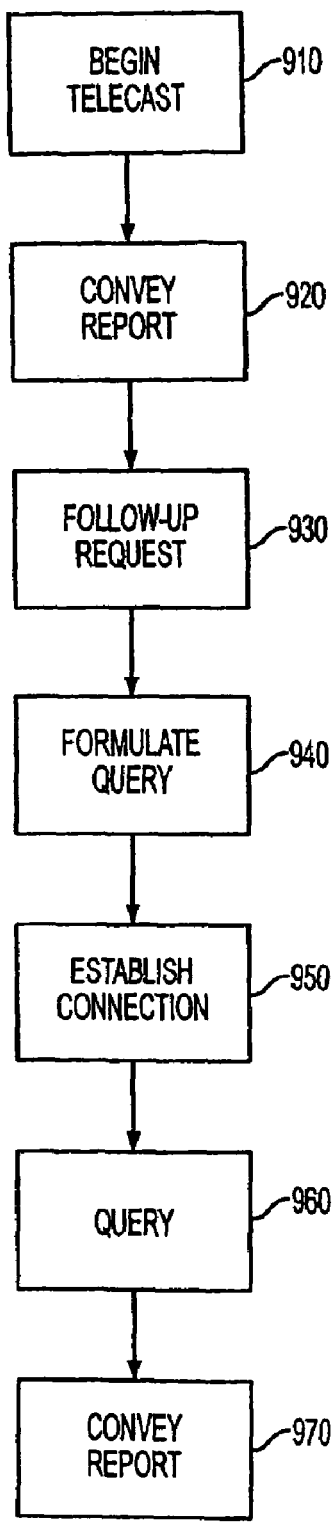
FIG. 9 is a flow chart depicting a method for making real-time follow-up queries according to one embodiment of the present invention.

One embodiment of a method for making real-time follow-up requests for information will now be explained. FIG. 9 depicts a flow chart indicating a method for making a real-time request for information during an interactive voice broadcast. According to the embodiment set forth in FIG. 9, the method begins with the deployment of an interactive voice broadcast by executing a service (step 910). As detailed below, this includes generating the content and combining this with personalization information to create an active voice page. A call server places a call to the user. During the call, information is delivered to the user through a voice-enabled terminal device (e.g., a telephone or cellular phone)(step 920).

During the interactive voice broadcast, a user may request additional information, e.g., based on options presented to the user (step 930). The request may be, but is not necessarily, based on the information that was presented to the user. According to one embodiment, the request comprises a user response to a set of options and/or input of information through a telephone keypad or other input mechanism. According to another embodiment, the request comprises a spoken, natural language request for information by the user. Other types of requests are possible.

According to one embodiment, the user responses and input are stored in a response collection which along with other information stored in the active voice page, can be used to retrieve the requested information. According to one embodiment, the active voice page comprises an XML-based document that includes embedded generic query statements. These embedded query statements are linked with, for example, option statements or prompts so that when a user enters information, the information is entered into the embedded query to form a specific query.

According to one embodiment, tokens are used to manage user inputs during the interactive voice broadcast. A token is a temporary variable that can hold different values during an interactive voice broadcast. When a user enters input, it is stored as a token. If the user input relates to a query, the token value will then be used to complete a query as described above. According to one embodiment, the system maintains a running list of tokens, or a response collection, during a broadcast.

In step 940 a search query is formulated for the follow-up request. The nature of the search query will vary according to the type of information requested and according to where that information is stored. According to one embodiment, the search query comprises a SQL statement to retrieve information stored in a database. According to another embodiment, the query comprises a simple boolean statement to retrieve information stored on a website.

In one embodiment, where the follow-up request is made in connection with the system shown and described in conjunction with FIGS. 1–7, the search query comprises an embedded SQL statement. The system described in connection with FIGS. 1–7 provides interactive voice services using TML, a markup language based on XML. Using TML active voice pages are constructed that contain the structure and content for an interactive voice broadcast including, inter alia, presenting the user with options and prompting the user for information. Moreover in connection with options and prompts, active voice pages also include embedded SQL statements. In connection with an option statement, the embedded SQL statement includes a predefined variable. When the user chooses to exercise an option, the predefined variable is replaced with the user choice, thus generating a complete SQL statement. A similar technique is used for formulating a boolean query.

In the system of FIGS. 1–8, the TML parsing engine in the call server includes the functionality necessary to generate the query as described above. For example, in connection with the embodiment described above, the TML parsing engine shown in FIG. 6 reads the active voice pages. When the TML parsing engine reads an option statement that includes and embedded SQL statement, it stores the SQL statement, defines a variable and variable location. When the user exercises that option, the user's input is received by the ML parsing engine and placed at the defined memory location to complete the SQL statement.

According to another embodiment, where the follow-up request is made via a natural language, voice request, a query could be formulated in a number of ways. According to one embodiment, speech recognition technology is used to translate the user's response into text. The text is then used to complete an embedded SQL statement as described above. According to another embodiment, speech recognition software is used to translate the request to text. The text is then converted to SQL using an SQL engine.

Returning to FIG. 9, in step 950 a connection is established with the source of the information. According to one embodiment, the source of information comprises a relational database that is connected to the voice service system. For example, in the system shown in FIGS. 1–7, call server 18, through the TML parsing engine 1812, establishes a connection with database system 12. According to another embodiment, the source of information comprises a database or website to which the system has dial-up access. According to this embodiment, the system establishes a telephone connection with the remote database or website during the interactive voice broadcast. Other embodiments are possible.

After a connection is established, the source of information is queried in step 960. That is, the query formulated in step 940 is used to access the information requested by the user in the follow-up request. According to one embodiment, the SQL statement generated is used to query the database and return a result set.

In step 970, the requested information is conveyed to the user. According to one embodiment, the system comprises the interactive voice service system shown and described in FIGS. 1–8. In this embodiment, the result is returned to TML parsing engine 1812 shown in FIG. 6 and translated to speech in text-to-speech engine 1814 and presented to the user during the same interactive voice broadcast. More specifically, and similar to the process described with respect to embedded SQL statements, TML also enables predefinition of a response statement. When the result is returned in step 960, it is inserted into the predefined response statement in TML parsing engine 1812 and conveyed to the user after being converted to speech in text-to-speech engine 1814.

The method of FIG. 9 has been described in conjunction with a real-time query against a data source. According to another embodiment, a follow-up request may comprise a request for additional information that was returned with the information originally requested. That is, as is known in the art, in connection with OLAP systems, a report may comprise information at many levels, only one of which is initially requested and reviewed. In such a case, the information at other levels is available, it just has not been reviewed. A user may, however, wish to review the data at another level. This process is called drilling.

Drilling allows the user to dynamically change the level of detail in a report. Drilling down changes the level of detail to a lower level attribute so that the resulting report displays data with a greater level of detail. For example, one can drill down from year to month to week to day. It is also possible to "drill up" to a higher level attribute. Drilling up summarizes the selected data to a higher level total. For example, one can drill from day to week to month to year. Drilling within is also possible and allows a user to go to a different hierarchy within the same dimension. Drilling within is often used to examine the characteristics of selected data. For example, drilling within enables a user to drill from item to color when looking at a particular retail item such as an automobile, clothing or the like. Drilling across allows the user to drill to an altogether different dimension. For example, one can drill across from a region to a month. These drilling capabilities are available through database system 12 of FIG. 4.

An example may help illustrate. In the retail environment, a report may return sales data for four regions. A user may initially request only the total sales data in each of the four regions. Nevertheless, the sales data in each of the four regions is comprised of the sales data from all of the individual stores in each region. A sales manager, after reviewing the regional sales data, may then "drill down" to view the sales data of individual stores within a region.

Therefore, according to another embodiment, the present invention comprises a method for enabling follow-up requests via drilling. The method proceeds according to the same steps shown in FIG. 9 and therefore, will only be explained where different.

The method proceeds to step 940 in a similar fashion as explained above. In step 940, a query is generated in a similar fashion to that described above. Drilling assumes that the original query results are available. Therefore, the query generated for drilling includes a tag that identifies the original query result. According to one embodiment, in connection with the system described in FIGS. 1-8 an embedded request to drill is included in the TML of the active voice pages. According to another embodiment, speech recognition could be used to formulate a query from the request to drill. In either embodiment, the query identifies the location of the original query result.

In step 950 a connection is established with the original query result. According to one embodiment, the original query results are stored in a database in memory in the system. And the step of establishing a connection includes locating the memory location where the results are stored. Other embodiments are possible.

Once the original query results are located, the results are queried in step 960. That is, according to this embodiment, the desired drilling is accomplished. In step 970, the results of the drilling are conveyed to the user as described above.

According to another embodiment, certain drilling results are performed in advance and stored for access by a user. This may be advantageous if a certain drilling result is repeatedly accessed by a user. In this embodiment, the method proceeds as indicated above, but, instead of accomplishing the drilling in real-time, the stored drilling results are accessed using the query generated. The stored results may be refreshed periodically.

According to one embodiment, the method discussed in conjunction with FIG. 9 could be implemented in conjunction with the system and method for automatic, interactive, real-time, voice transmission of OLAP output to one or more subscribers explained in conjunction with FIGS. 1-8. For example, subscribers may be called by the system, and have content delivered audibly over the telephone or other voice-enabled terminal device. During the IVB, information may be exchanged between the system and a subscriber. The system conveys content to the subscriber and, the subscriber may respond by pressing one or more buttons on a telephone touch pad dial (or other input mechanism) to hear more information, to exercise options, or to provide other responses. This interaction shapes the structure of a basic exchange between the system and the subscriber. During or after the call is terminated, the subscriber's responses may be stored and processed (e.g., by other applications).

Figure 1A:
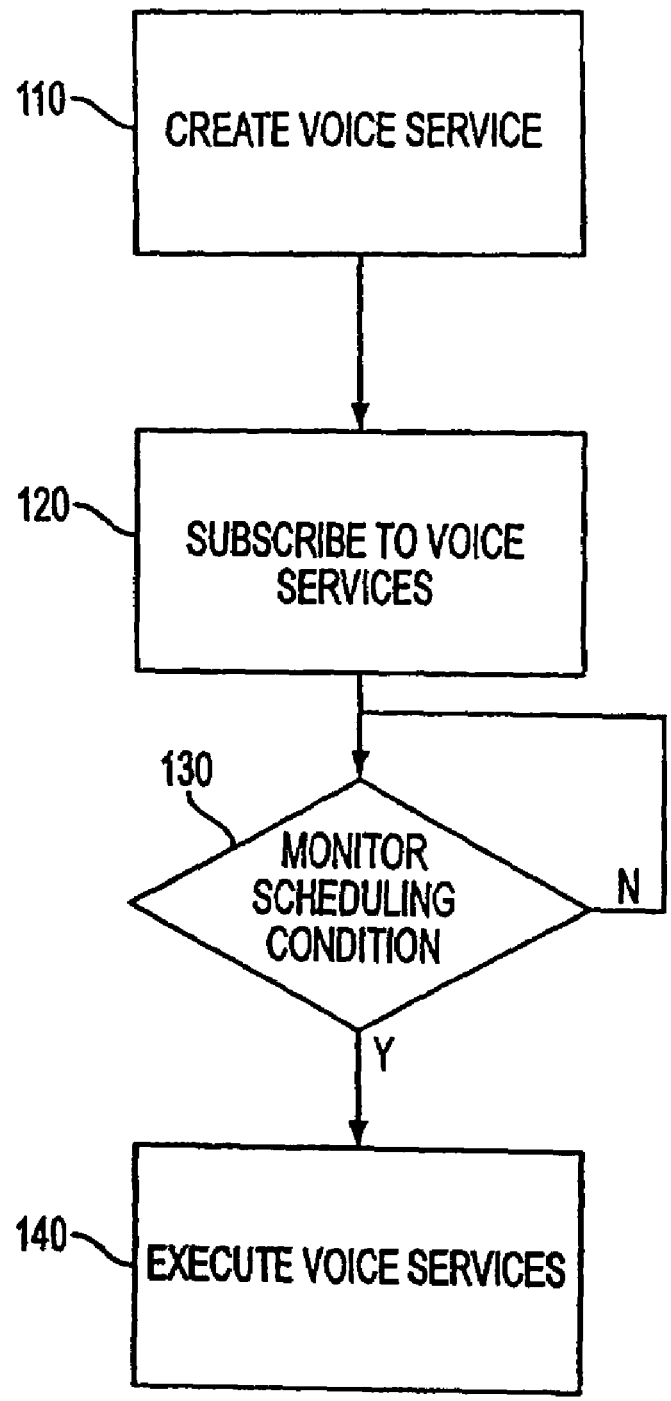
FIG. 1a is a flow chart of a method in accordance with an embodiment of the present invention.

According to one embodiment of the present invention, a method for automatic, interactive, real-time, voice transmission of OLAP output to one or more subscribers is provided. FIG. 1*a* depicts a flow chart of a method for automatic, interactive, real-time, voice transmission of OLAP output according to one embodiment. The method begins in step 110 with the creation of a voice service (e.g., by a system administrator or user). A voice service is created using, for example, a voice service wizard which may comprise a series of interfaces. One embodiment of a method for creating a voice service is explained in more detail below in conjunction with FIG. 1*b*. One embodiment of a voice service wizard is explained below in conjunction with FIG. 3*b*.

After a voice service is created, users may subscribe or be subscribed to the voice service (step 120), for example, by using a subscription interface. According to one embodiment, users may subscribe to an existing voice service over the telephone or by web-based subscription. A user may also be subscribed programmatically. In other embodiments, a user may subscribe to a voice service via electronic mail. Not every voice service created in step 110 is available for subscription. More specifically, according to another embodiment, only a user with appropriate access, such as the creator of the service, is allowed to subscribe himself or others to a service. Such a security feature may be set when the voice service is created.

In step 130, a scheduling condition or other predetermined condition for the voice services is monitored to determine when they are to be executed. That is, when a voice service is created or subscribed to, the creator or user specifies when the voice service is to be executed. A user may schedule a voice service to execute according to the date, the time of day, the day of the week, etc. and thus, the scheduling condition will be a date, a time, or a day of the week, either one time or on a recurring basis. In the case of an alert service, discussed in more detail below, the scheduling condition will depend on satisfaction of one or more conditions. According to one embodiment, the condition(s) to be satisfied is an additional scheduling condition. According to another embodiment, to another embodiment, a service may be executed "on command" either through an administrator or programmatically through an API. Scheduling of voice services is discussed in more detail below.

The method continues monitoring the scheduling condition for voice services until a scheduling condition is met. When a scheduling condition is met, that voice service is executed as illustrated in, for example, step 140. The execution of a voice service involves, inter alia, generating the content for the voice service, and structuring the voice service to be telecast through a call server. The execution of a voice service is explained in detail in conjunction with FIG. 1*c*.

An example of a telecast is as follows.
Personalized Greeting
Hello Joe, this is your stock update.
Pin Verification
Please enter your six digit PIN number
(Joe enters his PIN, using the keypad dial on his telephone.)
Menu Options
Your portfolio was up by $1000 today.
Please select:
1. To get a portfolio stock update
2. To conduct a transaction
(Joe presses 2)
Sub Menu
Thank you, Joe! Please select a ticker.
1. PQT
2. TQP
3. Listen to options again
4. Return to main menu
(Joe presses 1.)
Sub Menu
Would you like to buy or sell stock? Please press:
1. To sell stock
2. To buy stock
(Joe presses 1.)
Sub Menu
How many shares of PQT would you like to sell today? Please press:
1. To sell 50 shares
2. To sell 100 shares
3. To sell 200 shares
4. To sell another quantity
(Joe presses 2.)
Sub Menu
You selected 2. You want to sell 100 shares of PQT. Please press:
1. If this is correct
2. If this is incorrect
3. If you want to change the number of shares you want to buy.
(Joe presses 1.)
End Voice Service/Terminate Telecast
Thank you for using our voice interactive broadcasting service, Joe. We will call you
back when your transaction is completed. Good-bye.

As can be seen from the above sample during an IVB, the user is presented with information, e.g., the status of his portfolio, and is presented options related to that report, e.g., the option to buy or sell stock.

According to one embodiment, a voice service is constructed using service wizard. A voice service is constructed using several basic building blocks, or elements, to organize the content and structure of a call. According to one embodiment, the building blocks of a voice service comprise elements of a markup language. According to one particular embodiment, elements of a novel markup language based on XML (TML) are used to construct voice services. Before explaining how a telecast is constructed, it will be helpful to define these elements.

The DIALOG element is used to define a unit of interaction between the user and the system and it typically contains one or more of the other elements. A DIALOG can not be contained in another element.

The SPEECH element is used to define text to be read to a user.

The INPUT element is used to define a section of a DIALOG that contains interactive elements, i.e., those elements that relate to a response expected from a user and its validation. An INPUT element may contain OPTION, PROMPT and ERROR elements.

An OPTION element identifies a predefined user selection that is associated with a particular input. According to one embodiment, OPTION elements are used to associate one or more choices available to a user with telephone keys.

A PROMPT element defines a particular input that is expected. According to one embodiment, a PROMPT element defines that a sequence or number of key presses from a telephone keypad is expected as input. Unlike an OPTION Element, a PROMPT Element is not associated with predefined user selections.

The PROMPT and OPTION elements may also be used to request user input using natural language. According to one embodiment, speech recognition technology is used to enable a user to respond to a PROMPT element or to select an OPTION element verbally by saying a number, e.g., "one". The verbal response is recognized and used just as a keypress would be used. According to another embodiment, the user may provide a free form verbal input. For example, a PROMPT element may request that a user enter, e.g., the name of a business. In response the user speaks the name of a business. That spoken name is then resolved against predetermined standards to arrive at the input. Word spotting and slot filling may also be used in conjunction with such a PROMPT to determine the user input. For example, a PROMPT may request that the user speak a date and time, e.g., to choose an airline flight or to make a restaurant reservation. The user's spoken response may be resolved against known date and time formats to determine the input. According to another embodiment, a PROMPT is used to request input using natural language. For instance, in conjunction with a voice service to be used to make travel plans, instead of having separate PROMPT elements request input for flight arrival, departure dates and locations, a single natural language PROMPT may ask, "Please state your travel plan." In response, the user states 'I'd like to go from Washington D.C. to New York city on the $3^{rd}$ of January and return on the $3^{rd}$ of February. This request would be processed using speech recognition and pattern matching technology to derive the user's input.

The ERROR element is used to define the behavior of the system if a user makes an invalid response such as touching a number that has not been associated with an OPTION element, or entering input that does not meet the criteria of a PROMPT element. A SYS-ERROR element defines a handler for certain events, such as expiration of the waiting time for a user response.

The FOR-EACH element is used to direct the system to loop through a list of variables e.g., variables contained in a database report, or variables from a user input, to dynamically generate speech from data.

In addition to the elements described above, there are two features that maximize an administrator's ability to design voice services. Call Flow Reports enable an administrator to generate the structure of a call based on the content of an report e.g., from an OLAP system or other data repository. For example, the options presented to a user in a PROMPT element may be made to correspond to the row of a data report. According to one embodiment, report data is converted into options by application of an XSL (extensible style sheet language) style sheet. The result of this application is inserted into the static call structure when the voice service is executed.

The use of an XSL style sheet is a feature that maximizes an administrator's voice service building ability. As discussed above, they are used to create dynamic call structure that depends on data report output. They may also be used to generate a text string that comprises the message to be read to a user at any point in a call.

A method for creating a voice service according to one embodiment will now be explained in conjunction with FIG. 2. The method begins in step 210 by naming the voice service. Then, in step 220 various scheduling parameters of the voice service are defined. In step 250 the service content is defined. And, in step 260, the personalization modes, or style properties are selected for the voice service.

According to one embodiment, in step 210, a voice service is named and a description of the voice service provided. By providing a name and description, a voice service may be uniquely identified. An interface is provided for prompting input of the name of the service to be created or edited. An input may also be provided for a written description. An open typing field would be one option for providing the description input. According to another embodiment, if an existing call service has been selected to edit, the service name field may not be present or may not allow modification.

In step 220, conditions for initiating the service are selected. This may include selecting and defining a service type. At least two types of services may be provided based on how the services are triggered. A first type of service is run according to a predetermined schedule and output is generated each time the service is run. A second type of service, an alert service, is one that is run periodically as well, however, output is only generated when certain criteria is satisfied. Other service types may be possible as well. In one embodiment the administrator is prompted to choose between a scheduled service or an alert service. An interface may provide an appropriate prompt and some means for selecting between a scheduled service and an alert service. One option for providing the input might be an interface with a two element toggle list.

In one embodiment, a set of alert conditions is specified to allow the system to evaluate when the service should be initiated if an alert type service has been selected. In one embodiment, a report or a template/filter combination upon which the alert is based is specified. Reports and template/filter combinations may be predefined by other objects in the system including an agent module or object creation module. According to one embodiment, an agent module, such as DSS agent™ offered by MicroStrategy, may be used to create and define reports with filters and template combinations, and to establish the alert criteria for an alert service. According to another embodiment, an interface is be provided which includes a listing of any alert conditions presently selected for the voice service. According to this embodiment, the interface may comprise a display window. A browse feature may take the user to a special browsing interface configured to select a report or filter-template combination. One embodiment of an interface for selecting reports and filter-template combinations is described below. Once a report or filter and template combination is chosen, the alerts contained in the report or filter and template combination may be listed in the display window of the interface.

In step 240, the schedule for the service is also selected. According to one embodiment, predefined schedules for voice services may be provided or a customized schedule for the voice service may be created. If a new schedule is to be created, a module may be opened to enable the schedule name and parameters to be set. Schedules may be run on a several-minute, hourly, daily, monthly, semi-annual, annual or other bases, depending upon what frequency is desired. According to one embodiment, an interface is provided that allows the administrator to browse through existing schedules and select an appropriate one. The interface may provide a browsing window for finding existing schedule files and a "new schedule" feature which initiates the schedule generating module. In one embodiment, schedules may not be set for alert type services. However, in some embodiments, a schedule for evaluating whether alert conditions have been met may be established in a similar manner.

In step 230, the duration of the service is also set. Service duration indicates the starting and stopping dates for the service. Setting a service duration may be appropriate regardless of whether a scheduled service or alert type service has been selected. The start date is the base line for the scheduled calculation, while the end date indicates when the voice service will no longer be sent. The service may start immediately or at some later time. According to one embodiment the interface is provided to allow the administrator to input start and end dates. The interface may also allow the administrator to indicate that the service should start immediately or run indefinitely. Various calendar features may be provided to facilitate selection of start and stop dates. For example, a calendar that specifies a date with pull-down menus that allow selection of a day, month and year may be provided according to known methods of selecting dates in such programs as electronic calendar programs and scheduling programs used in other software products. One specific aid that may be provided is to provide a calendar with a red circle indicating the present date and a blue ellipse around the current numerical date in each subsequent month to more easily allow the user to identify monthly intervals. Other methods may also be used.

In step 220, a voice service may also be designated as a mid-tier slicing service. In one embodiment, mid-tier slicing services generate content and a dynamic subscriber list in a single query to an OLAP system. According to one embodiment, in a mid-tier slicing service a single database query is performed for all subscribers to the service. The result set developed by that query is organized in a table that contains a column that indicates one or more users that each row of data is applicable to.

In step 250, the content of the voice service is defined. Defining the content of the voice service may include selecting the speech to be delivered during the voice service broadcast (content), the structure of dialogs, menus, inputs, and the background procedures which generate both content and structure. In one embodiment, defining voice service content establishes the procedures performed by the vss server to assemble one or more active voice pages in response to initiation of the voice service. According to one embodiment, defining service content involves establishing a hierarchical structure of TML elements which define the structure and content of a voice service. All of the elements in a given service may be contained within a container.

The personalization type is selected in step 260. Personalization type defines the options that the administrator will have in applying personalization filters to a voice service. According to one embodiment, a personalization filter is a set of style properties that can be used to determine what content generated by the service will be delivered to the individual user and in what format it will be delivered. In one embodiment, personalizing the delivery format may include selection of style properties that determine the sex of the voice, the speed of the voice, the number of call back attempts, etc. Personalization filters may exist for individual users, groups of users, or types of users. According to one embodiment, personalization filters may be created independent of the voice service. According to this embodiment, a voice service specifies what filters are used when generating IVBs. Some personalization type options may include: allowing no personalization filters; allowing personalization filters for some users, but not requiring them; and requiring personalization filters for all interactive voice broadcasts made using the service.

According to one embodiment, specifying personalization type is accomplished by administrator input through an interface. The interface may offer a toggle list with the three options: required personalization, optional personalization, and no personalization.

Figure 3A:
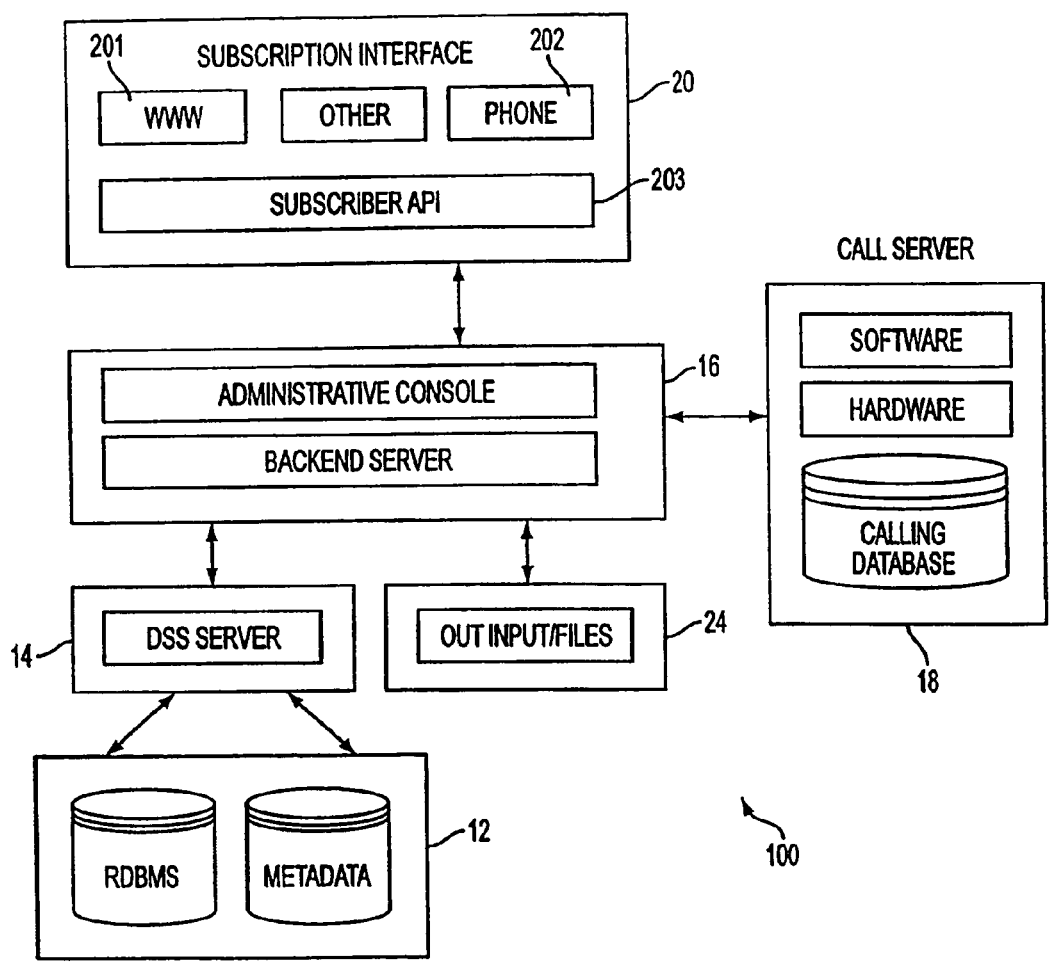
FIG. 3a is a schematic block diagram of a system in accordance with an embodiment of the present invention.
Figure 3B:
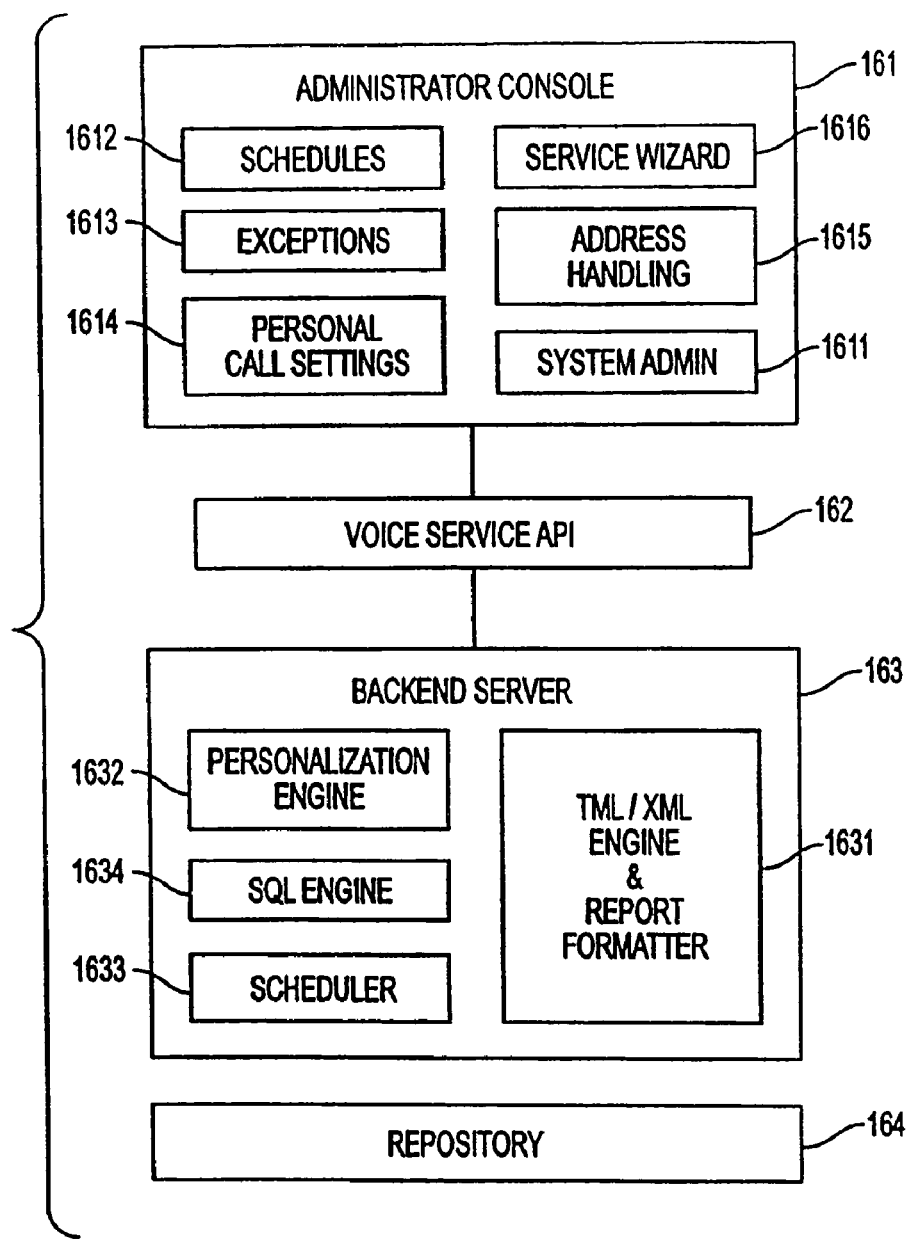
FIG. 3b is a schematic block diagram of an intelligence server according to an embodiment of the present invention.
Figure 3C:
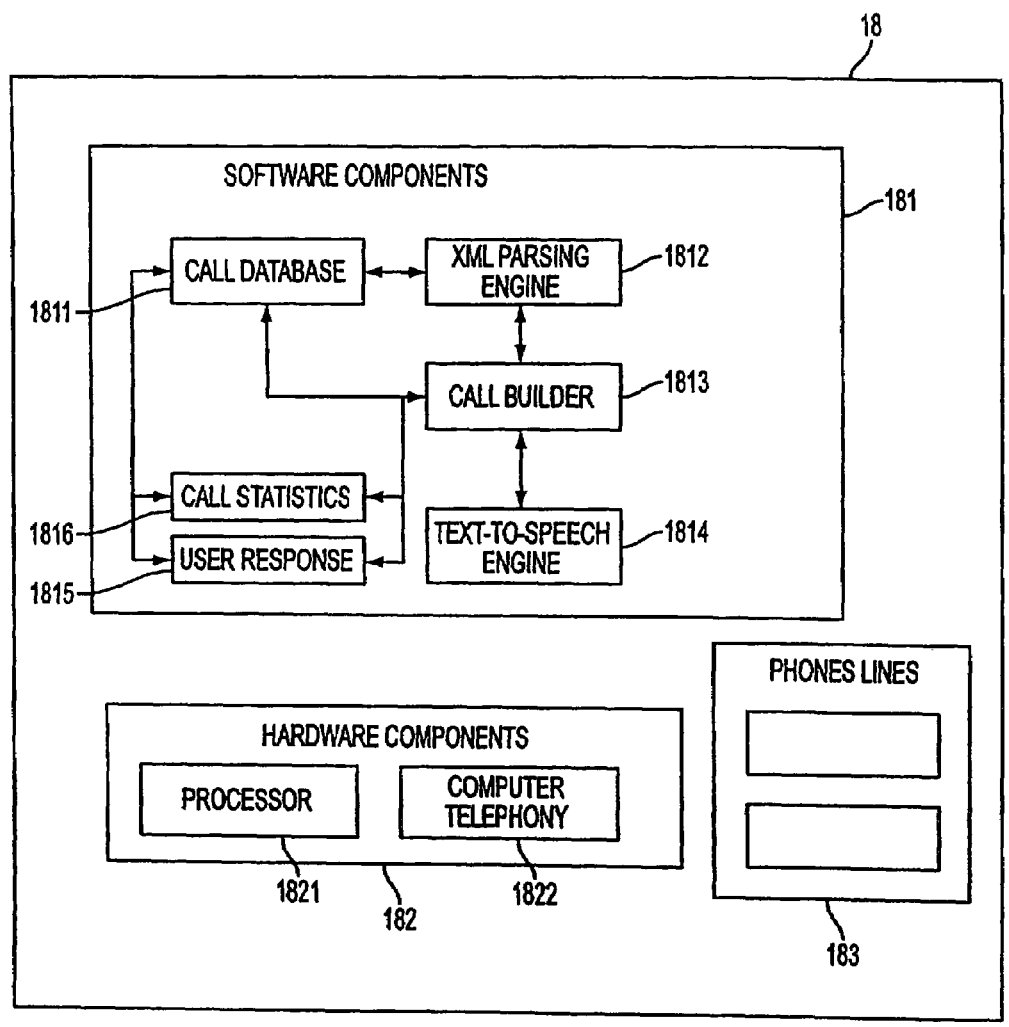
FIG. 3c is a schematic block diagram of call server according to an embodiment of the present invention.

The voice service may be stored in a database structure to enable users to retrieve predefined voice services and to subscribe to these services, for example, through subscription interfaces explained in conjunction FIGS. 3a–3c or otherwise. An interface informing the administrator that creation of the voice service is complete may also be provided.

Figure 1B:
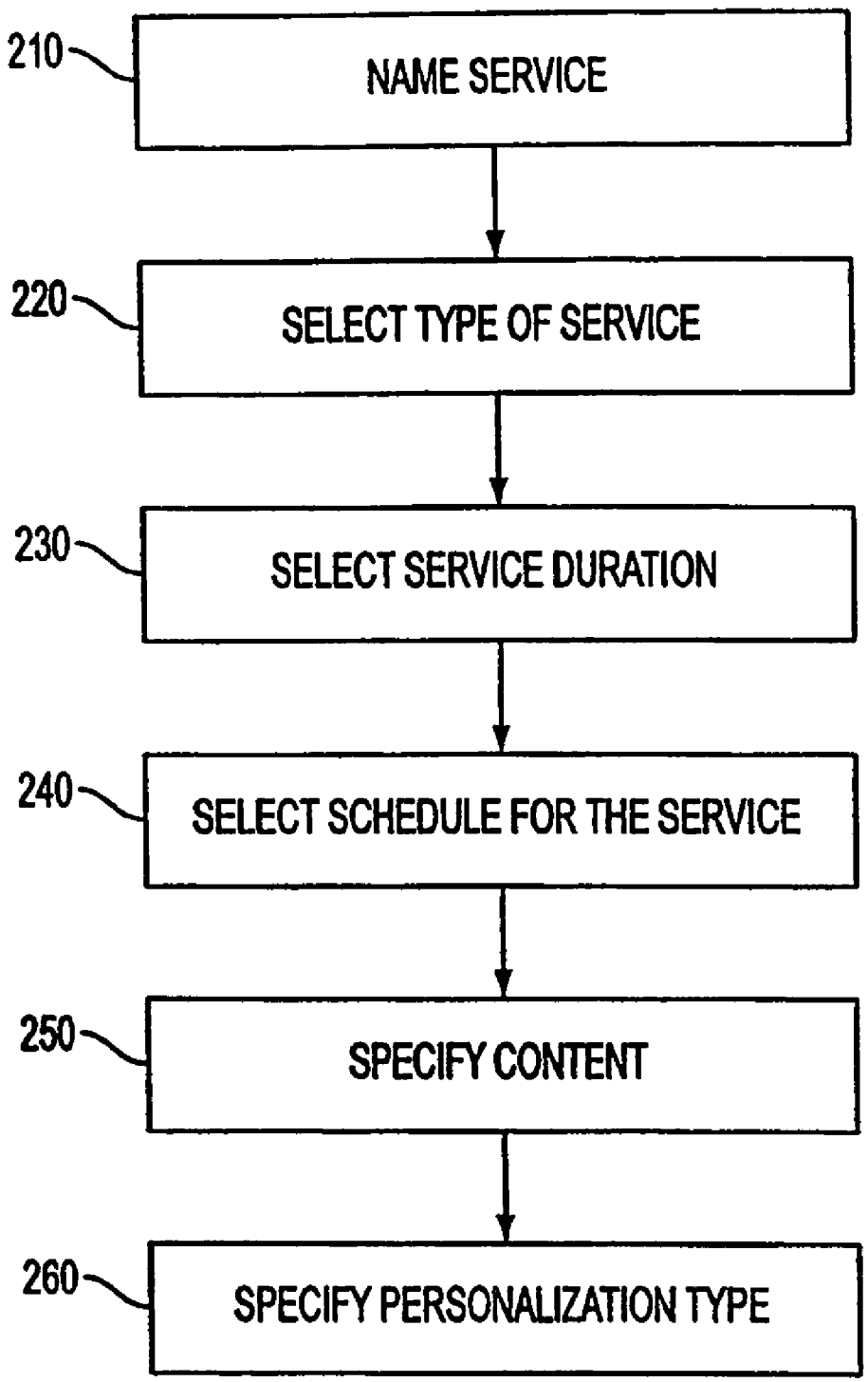
FIG. 1b is a flow chart indicating a method of generating a voice service according to one embodiment of the present invention.

According to one embodiment, the method of FIG. 1b also comprises an error condition step. An error condition step may be used to enable administrators to specify "error" conditions and the handling of those conditions. For example, an "error" condition may comprise a notification that a server is "down" or that there is no data to be returned. An administrator may specify particular actions to be performed by the system in response to one or more error conditions. For example, an administrator may specify an "addressing" error (e.g., disconnected number) and indicate a particular action to be performed in response to an "addressing" error (e.g., notify system administrator). Other error conditions might include: an alert report encountering an error and returning no data; a subscriber lacking the required personalization filter for the service; errors occurring in the generation of one or more reports; or reports returning no data. Various other conditions and actions may be specified. Certain error conditions may be predetermined for the system, but an administrator may have reasons for supplementing or diverging from the predetermined error conditions. According to one particular embodiment, error conditions are specified using the ERROR and SYS-ERROR elements.

In one embodiment, setting error conditions may be accomplished using an error handling interface. The interface may allow the administrator to select either default error handling, or to customize error handling using a module for defining error handling. If default handling is selected, the system uses established settings. If customized handling is chosen, the user may use a feature to access the appropriate interface for the error handling module.

Servers may have limited capacity to perform all of the actions required of them simultaneously, the method of FIG. 1b comprises a step for prioritizing the execution and delivery of voice services. Prioritization may establish the order in which the voice service system allocates resources for processing voice service and delivering the IVB. According to one embodiment, assigning priority to a voice service establishes priority for queries to the database system, formatting the voice service, or IVBs. Any criteria may be used for establishing priority. According to one embodiment, priority is established based on service content. According to another embodiment, priority is based on service destination. According to another embodiment, priority may be established based on the type of voice service, i.e., alert v. scheduled. Any number of procedures or criteria for denoting relative importance of service delivery may be established.

In one embodiment, an interface is provided for defining the priority of the voice service being created or edited. According to one embodiment, the interface comprises a screen including option boxes with pull down menus listing the number of different prioritization options.

Figure 1C:
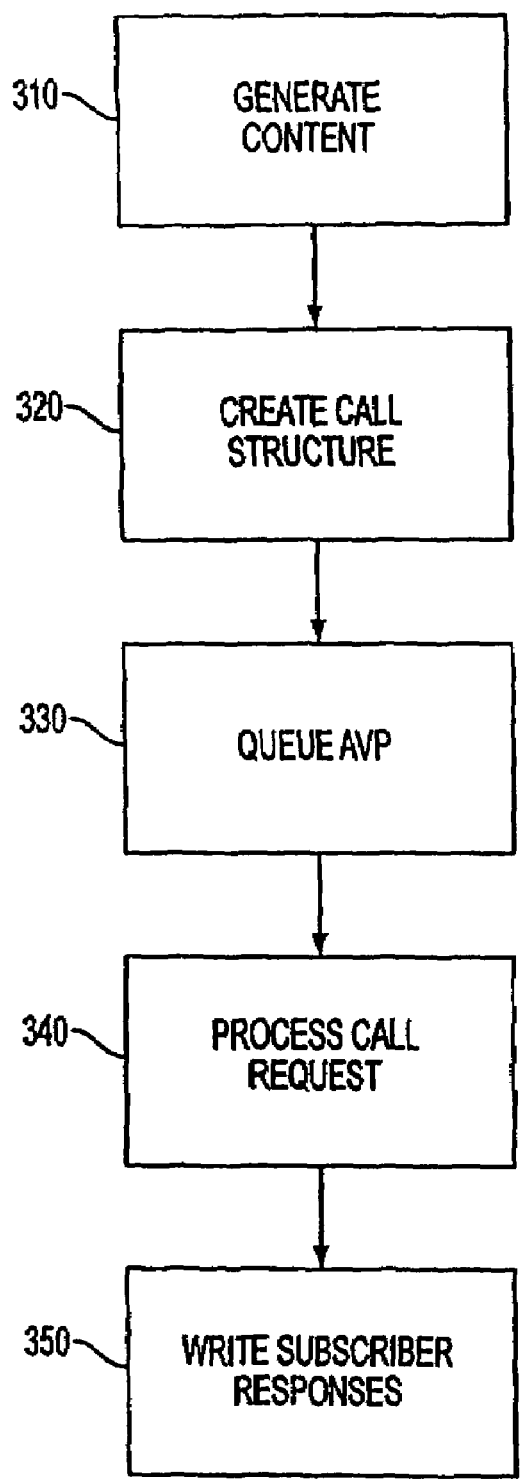
FIG. 1c is a flow chart indicating a method for interactive voice broadcasting according to an embodiment of the present invention.

Another aspect of the invention relates to a method for executing a voice service. FIG. 1c depicts one example of a flow chart for executing a voice service. In step 310, the content of a voice service is generated. In step 320, the call structure of a telecast is created via Active Voice Pages. In step 330, the AVPs are put in a call database for processing e.g., in a call queue. In step 340, the call request is processed and an interactive voice broadcast with the user is implemented. In step 350, user's responses are written back to the voice service system (e.g., the Active Voice Page). Each of these steps will be explained in more detail below.

According to one embodiment, content is created in step 310 as follows. A voice service execution begins by running scheduled reports, queries or by taking other action to determine whether the service should be sent. The subscribers for the service are then resolved. Datasets are generated for each group of subscribers that has unique personalization criteria.

Call structure may be created (step 320) as follows. An AVP contains data at various hierarchical content levels (nodes) that can be either static text or dynamic content. Static text can be generated e.g., by typing or by incorporating a text file. Dynamic content may be generated e.g., by inserting data from a data report using a grid an/or an XSL stylesheet. Moreover, content is not limited to text based information. Other media, such as, sound files, may be incorporated into the AVP. The call data (for example, at a particular level) may be the text that is converted to speech and played when the recipient encounters the node.

According to another embodiment, call content may include "standard" active voice pages that are generated and inserted into a database or Web Server where the pages are periodically refreshed. According to one particular embodiment, the active voice page that is generated for a user contains links to these standard active voice pages. The links may be followed using a process similar to web page links.

The call structure may comprise either a static structure that is defined in the voice service interfaces e.g., by typing text into a text box and/or a dynamic structure generated by grid/XSL combinations. The dynamic structure is merged with static structure during the service execution. A single call structure is created for each group of users that have identical personalization properties across all projects because such a group will receive the same content.

After a call structure is generated, in step 330, it is sent to a call database e.g., call database 1811 shown in FIG. 3c alone with the addresses and style properties of the users. The style properties govern the behavior of a call server 18 in various aspects of the dialog with a user. Call server 18 queries call database 1811 for current call requests and places new call requests in its queue.

In step 340, a call request is processed. A call is implemented on call server 18 using one of several ports that are configured to handle telephone communication. When a port becomes available, the call request is removed from the queue and the call is made to the user. As the user navigates through an active voice page, e.g., by entering input using the key pad or by speaking responses, call/content is presented by converting text to speech in text-to-speech engine 1814. User input during the call may be stored for processing. According to another embodiment, user responses and other input may also be used to follow links to other active voice pages. For example, as explained above, "standard" active voice pages may be generated and inserted into a database or Web Server. Then, when a user's voice service is delivered, that voice service may contain links to information that may be accessed by a user. A user may access those standard active voice pages by entering input in response to OPTION or PROMPT elements.

In step 350, user responses are stored by the system. According to one embodiment, user responses are stored in a response collection defined by the active voice page. A voice service may specify that a subscriber return information during an IVB so that another application may process the data. For instance, a user may be prompted to purchase a commodity and be asked to enter or speak the number of units for the transaction. During or after an IVB, the subscriber's responses are written to a location from which they can be retrieved for processing (e.g. by an external application).

Figure 2:
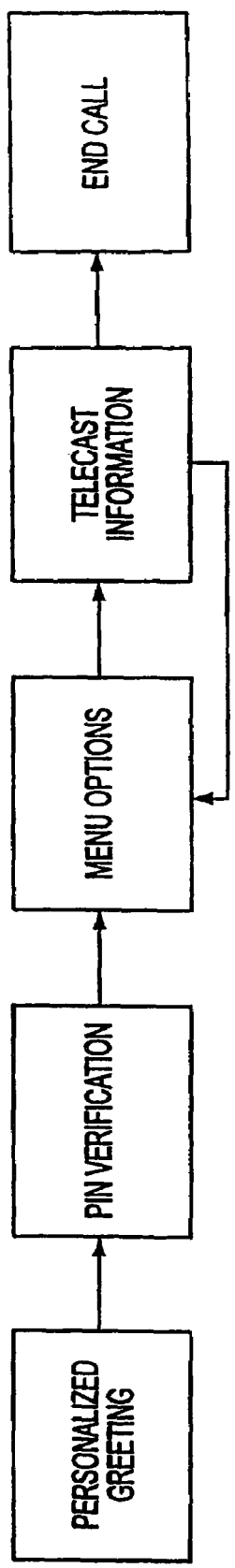
FIG. 2 is a flow chart indicating a sequence of an interactive voice broadcast according to one embodiment of the present invention.

FIG. 2 is an example of an IVB with interactive call flow. An IVB usually contains a greeting message that addresses the targeted user, identifies the name of the calling application, and states the purpose of the call and/or presents summary metrics. The voice service system can also implement a PIN verification protocol, if this layer of security is required. The main menu structure of an IVB can contain a number of options that lead to sub-menu structures. A menu can also contain prompts for the user to enter numerical information using a telephone touch pad dial. A node along the hierarchical menu structure may have options to return the user to a higher level.

FIG. 3*a* depicts an embodiment of a system according to one embodiment of the present invention. Preferably, the system comprises database system 12, a DSS server 14, voice server 16, a call server 18, subscription interface 20, and other out input/files 24.

Database system 12 and DSS server 14 comprise an OLAP system that generates user-specified reports from data maintained by database system 12. Database system 12 may comprise any data warehouse or data mart as is known in the art, including a relational database management system ("RDBMS"), a multidimensional database management system ("MDDBMS") or a hybrid system. DSS server 14 may comprise an OLAP server system for accessing and managing data stored in database system 12. DSS server 14 may comprise a ROLAP engine, MOLAP engine or a HOLAP engine according to different embodiments. Specifically, DSS server 14 may comprise a multithreaded server for performing analysis directly against database system 12. According to one embodiment, DSS server 14 comprises a ROLAP engine known as DSS Server™ offered by MicroStrategy.

Voice service server (VSS) 16, call server 18 and subscription interface 20 comprise a system through which subscribers request data and reports e.g., OLAP reports through a variety of ways and are verbally provided with their results through an IVB. During an IVB, subscribers receive their requested information and may make follow-up requests and receive responses in real-time as described above. Although the system is shown, and will be explained, as being comprised of separate components and modules, it should be understood that the components and modules may be combined or further separated. Various functions and features may be combined or separated Subscription interface 20 enables users or administrators of the system to monitor and update subscriptions to various services provided through VSS 16. Subscription interface 20 includes a world wide web (WWW) interface 201, a telephone interface 202, other interfaces as desired and a subscriber API 203. WWW interface 201 and telephone interface 202 enable system 100 to be accessed, for example, to subscribe to voice services or to modify existing voice services. Other interfaces may be used. Subscriber API 203 provides communication between subscription interface 20 and VSS 16 so that information entered through subscription interface 20 is passed through to VSS 16.

Subscription interface 20 is also used to create a subscriber list by adding one or more subscribers to a service. Users or system administrators having access to VSS 16 may add multiple types of subscribers to a service such as a subscriber from either a static recipient list (SRL) (e.g., addresses and groups) or a dynamic recipient list (DRL) (described in further detail below). The subscribers may be identified, for example, individually, in groups, or as dynamic subscribers in a DRL. Subscription interface 20 permits a user to specify particular criteria (e.g., filters, metrics, etc.) by accessing database system 12 and providing the user with a list of available filters, metrics, etc. The user may then select the criteria desired to be used for the service. Metadata may be used to increase the efficiency of the system.

A SRL is a list of manually entered names of subscribers of a particular service. The list may be entered using subscription interface 20 or administrator console 161. SRL entries may be personalized such that for any service, a personalization filter (other than a default filter) may be specified. A SRL enables different personalizations to apply for a login alias as well. For example, a login alias may be created using personalization engine 1632. Personalization engine 1632 enables subscribers to set preferred formats, arrangements, etc. for receiving content. The login alias may be used to determine a subscriber's preferences and generate service content according to the subscriber's preferences when generating service content for a particular subscriber.

A DRL may be a report which returns lists of valid user names based on predetermined criteria that are applied to the contents of a database such as database system 12. Providing a DRL as a report enables the DRL to incorporate any filtering criteria desired, thereby allowing a list of subscribers to be derived by an application of a filter to the data in database system 12. In this manner, subscribers of a service may be altered simply by changing the filter criteria so that different user names are returned for the DRL. Similarly, subscription lists may be changed by manipulating the filter without requiring interaction with administrator console 161. Additionally, categorization of each subscriber may be performed in numerous ways. For example, subscribers may be grouped via agent filters. In one specific embodiment, a DRL is created using DSS Agent™ offered by MicroStrategy.

VSS 16 is shown in more detail in FIG. 3*b*. According to one embodiment, VSS 16 comprises administrator console 161, voice service API 162 and backend server 163. Administrator console 161 is the main interface of system 100 and is used to view and organize objects used for voice broadcasting. Administrator console 161 provides access to a hierarchy of additional interfaces through which a system administrator can utilize and maintain system 100. Administrator console 161 comprises system administrator module 1611, scheduling module 1612, exceptions module 1613, call settings module 1614, address handling module 1615, and service wizard 1616.

System administrator module 1611 comprises a number of interfaces that enable selection and control of the parameters of system 100. For example, system administrator module 1611 enables an administrator to specify and/or modify an email system, supporting servers and a repository server with which system 100 is to be used. System administrator 1611 also enables overall control of system 100. For example, system administrator module is also used to control the installation process and to start, stop or idle system 100. According to one embodiment, system administrator 1611 comprises one or more graphical user interfaces (GUIs).

Scheduling module 1612 comprises a number of interfaces that enable scheduling of voice services. Voice services may be scheduled according to any suitable methodology, such as according to scheduled times or when a predetermined condition is met. For example, the predetermined condition may be a scheduled event (time-based) including, day, date and/or time, or if certain conditions are met. In any event, when a predetermined condition is met for a given service, system 100 automatically initiates a call to the subscribers of that service. According to one embodiment, scheduling module 1612 comprises one or more GUIs.

Exceptions module 1613 comprises one or more interfaces that enable the system administrator to define one or more exceptions, triggers or other conditions. According to one embodiment, exceptions module 1613 comprises one or more GUIs.

Call settings module 1614 comprises one or more interfaces that enable the system administrator to select a set of style properties for a particular user or group of users. Each particular user may have different options for delivery of voice services depending on the hardware over which their voice services are to be delivered and depending on their own preferences. As an example of how the delivery of voice services depends on a user's hardware, the system may deliver voice services differently depending on whether the user's terminal device has voice mail or not. As an example of how the delivery of voice services depends on a user's preferences, a user may chose to have the pitch of the voice, the speed of the voice or the sex of the voice varied depending on their personal preferences. According to one embodiment, call settings module 1614 comprises one or more GUIs.

Address handling module 1615 comprises one or more interface that enable a system administrator to control the address (e.g., the telephone number) where voice services content is to be delivered. The may be set by the system administrator using address handling module 1615. According to one embodiment, address handling module 1615 comprises one or more GUIs.

Voice service wizard module 1616 comprises a collection of interfaces that enable a system administrator to create and/or modify voice services. According to one embodiment, service wizard module 1616 comprises a collection of interfaces that enable a system administrator to define a series of dialogs that contain messages and inputs and determine the call flow between these dialogs based on selections made by the user. The arrangement of the messages and prompts and the flow between them comprises the structure of a voice service. The substance of the messages and prompts is the content of a voice service. The structure and content are defined using service wizard module 1616.

Voice service API 162 (e.g., MicroStrategy Telecaster Server API) provides communication between administrator console 161 and backend server 163. Voice Service API 162 thus enables information entered through administrator console 161 to be accessed by backend server 163 (e.g., MicroStrategy Telecaster Server).

Backend server 163 utilizes the information input through administrator console 161 to initiate and construct voice services for delivery to a user. Backend server 163 comprises report formatter 1631, personalization engine 1632, scheduler 1633 and SQL engine 1634. According to one embodiment, backend server 163 comprises MicroStrategy Broadcast Server. Report formatter 1631, personalization engine 1632, and scheduler 1633 operate together, utilizing the parameters entered through administrator console 161, to initiate and assemble voice services for transmission through call server 18. Specifically, scheduler 1633 monitors the voice service schedules and initiates voice services at the appropriate time. Personalization engine 1632 and report formatter 1631 use information entered through service wizard 1616, exceptions module 1613, call settings module 1614, and address module 1615, and output provided by DSS server 14 to assemble and address personalized reports that can be sent to call server 18 for transmission. According to one embodiment, report formatter 1631 includes an XML based markup language engine to assemble the voice services. In a particular embodiment, report formatter includes a Telecaster Markup Language engine offered by MicroStrategy Inc. to assemble the call content and structure for call server 18.

SQL engine 1634 is used to make queries against a database when generating reports. More specifically, SQL engine 1634 converts requests for information into SQL statements to query a database.

Repository 164 may be a group of relational tables stored in a database. Repository 164 stores objects which are needed by system 100 to function correctly. More than one repository can exist, but preferably the system 100 is connected to only one repository at a time.

According to one embodiment, a call server 18 is used to accomplish transmission of the voice services over standard telephone lines. Call server 18 is shown in more detail in FIG. 3c. According to one embodiment, call server 18 comprises software components 181 and hardware components 182. Software components 181 comprise call database 1811, mark-up language parsing engine 1812, call builder 1813, text-to-speech engine 1814, response storage device 1815 and statistic accumulator 1816.

Call database 1811 comprises storage for voice services that have been assembled in VSS 16 and are awaiting transmission by call server 18. These voice services may include those awaiting an initial attempt at transmission and those that were unsuccessfully transmitted (e.g., because of a busy signal) and are awaiting re-transmission. According to one embodiment, call database 1811 comprises any type of relational database having the size sufficient to store an outgoing voice service queue depending on the application. Call database 1811 also comprises storage space for a log of calls that have been completed.

Voice services stored in call database 1811 are preferably stored in a mark-up language. Mark-up language parsing engine 1812 accepts these stored voice services and separates the voice services into parts. That is, the mark-up language version of these voice services comprises call content elements, call structure elements and mark-up language instructions. Mark-up language parsing engine 1812 extracts the content and structure from the mark-up language and passes them to call builder 1813.

Call builder 1813 is the module that initiates and conducts the telephone call to a user. More specifically, call builder dials and establishes a connection with a user and passes user input through to markup language parsing engine 1812. In one embodiment, call builder 1813 comprises "Call Builder" software available from Call Technologies Inc. Call builder 1813 may be used for device detection, line monitoring for user input, call session management, potentially transfer of call to another line, termination of a call, and other functions.

Text-to-speech engine 1814 works in conjunction with mark-up language parsing engine 1812 and call builder 1813 to provide verbal communication with a user. Specifically, after call builder 1813 establishes a connection with a user, text-to-speech engine 1814 dynamically converts the content from mark-up language parsing engine 1812 to speech in real time.

A voice recognition module may be used to provide voice recognition functionality for call server 181. Voice recognition functionality may be used to identify the user at the beginning of a call to help ensure that voice services are not presented to an unauthorized user or to identify if a human or machine answers the call. This module may be a part of call builder 1813. This module may also be used to recognize spoken input (say "one" instead of press "1"), enhanced command execution (user could say "transfer money from my checking to savings"), enhanced filtering (instead of typing stock symbols, a user would say "MSTR"), enhanced prompting, (saying numeral values).

User response module 1815 comprises a module that stores user responses and passes them back to intelligence server 16. Preferably, this is done within an AVP. During a telephone call, a user may be prompted to make choices in response to prompts by the system. Depending on the nature of the call, these responses may comprise, for example, instructions to buy or sell stock, to replenish inventory, or to buy or rebook an airline flight. User response module 1815 comprises a database to store these responses along with an identification of the call in which they were given. The identification of the call in which they were given is important to determining what should be done with these responses after the call is terminated. User responses may be passed back to intelligence server 16 after the call is complete. The responses may be processed during or after the call, by the system or by being passed to another application.

Statistics accumulator 1816 comprises a module that accumulates statistics regarding calls placed by call builder 1813. These statistics including, for example, the number of times a particular call has been attempted, the number of times a particular call has resulted in voice mail, the number of times a user responds to a call and other statistics, can be used to modify future call attempts to a particular user or the structure of a voice service provided to a particular user. For example, according to one embodiment, statistics accumulator 1816 accumulates the number of times a call has been unsuccessfully attempted by call builder 1813. This type of information is then used by call server 18 to determine whether or not the call should be attempted again, and whether or not a voice mail should be left.

Call server 18 also comprises certain hardware components 182. As shown in FIG. 3c, hardware components 182 comprise processor 1821 and computer telephone module 1822. According to one embodiment, processor 1821 comprises a Pentium II processor, available from Intel, Inc. Module 1822 provides voice synthesis functionality that is used in conjunction with Text to Speech engine 1814 to communicate the content of voice services to a user. Module 1822 preferably comprises voice boards available from Dialogic, Inc. Other processors and synthesizers meeting system requirements may be used.

The system and method of the present invention may form an integral part of an overall commercial transaction processing system.

According to one embodiment of the present invention, a system and method that enable closed-loop transaction processing are provided. The method begins with the deployment of an IVB by executing a service. As detailed above, this includes generating the content and combining this with personalization information to create an active voice page. Call server 18 places a call to the user. During the call, information is delivered to the user through a voice-enabled terminal device (e.g., a telephone or cellular phone). Phone lines 183 may be used for communication purposes.

During the IVB, a user may request a transaction, service, further information from the database or other request, e.g., based on options presented to the user. These will generically be referred to as transactions. The request may be, but is not necessarily, based on or related to information that was delivered to the user. According to one embodiment, the request comprises a user response to a set of options and/or input of information through a telephone keypad, voice input or other input mechanism. According to another embodiment, the request can be made by a user by speaking the request. Other types of requests are possible.

According to one embodiment, the user responses are written to a response collection, which along with information stored in the active voice page, can be used to cause a selected transaction to be executed. According to one embodiment, the active voice page comprises an XML-based document that includes embedded, generic requests, e.g., a request for a transaction, or a request for additional information (a database query). These embedded requests are linked with, for example option statements or prompts so that when a user enters information, the information is entered into the generic request and thus completes a specific transaction request. For example, in the example if a user exercises an option to buy a particular stock, that stock's ticker symbol is used to complete a generic "stock buy" that was embedded in the active voice page.

According to one embodiment, tokens are used to manage user inputs during the IVB. A token is a temporary variable that can hold different values during an IVB. When a user enters input, it is stored as a token. The token value is used to complete a transaction request as described above. According to one embodiment, the system maintains a running list of tokens, or a response collection, during an IVB.

In order to complete the requested transaction, the user responses (and other information from the active voice page) may need to be converted to a particular format. The format will depend, for example, on the nature and type of transaction requested and the system or application that will execute the transaction. For example, a request to purchase goods through a web-site may require the information to be in HTML/HTTP format. A request for additional information may require and SQL statement. A telephone-based transaction may require another format.

Therefore, the transaction request is formatted. According to one embodiment, the transaction is formatted to be made against a web-based transaction system. According to another embodiment, the transaction request is formatted to be made against a database. According to another embodiment, the transaction is formatted to be made against a telephone-based transaction system. According to another embodiment, the transaction is formatted to be made via e-mail or EDI. Other embodiments are possible.

In one embodiment, the formatted transaction request comprises an embedded transaction request. The system described in connection with FIGS. 1–3 provides interactive voice services using TML, a markup language based on XML. Using TML active voice pages are constructed that contain the structure and content for a interactive voice broadcast including, inter alia, presenting the user with options and prompting the user for information. Moreover in connection with OPTION and PROMPT elements, active voice pages also can include embedded statements such as transaction requests. Therefore, the formatting for the transaction request can be accomplished ahead of time based on the particular types of transactions the user may select.

For example, in connection with an exemplary stock purchase, an active voice page can include an embedded transaction request to sell stock in the format necessary for a particular preferred brokerage. The embedded statement would include predefined variables for the name of the stock, the number of shares, the type of order (market or limit, etc.), and other variables. When the user chooses to exercise the option to buy or sell stock, the predefined variables are replaced with information entered by the user in response to OPTION or PROMPT elements. Thus, a properly formatted transaction request is completed.

In the system of FIGS. 1–3, TML parsing engine in call server 18 includes the functionality necessary to generate the properly formatted transaction request as described above. For example, in connection with the embodiment described above, the TML parsing engine shown in FIG. 3c reads the active voice pages. When the TML parsing engine reads an OPTION element that includes and embedded transaction request, it stores the transaction request, and defines the necessary variables and variable locations. When the user exercises that OPTION, the user's input is received by the TML parsing engine and placed at the memory locations to complete the transaction request This technique could be used, for example, to generate a formatted transaction request for web-site.

According to another embodiment, where the traction request is made via a natural language, voice request, a formatted transaction request can be generated in a number of ways. According to one embodiment, speech recognition technology is used to translate the user's request into text and parse out the response information. The text is then used to complete an embedded transaction request as described above. According to another embodiment, speech recognition software is used to translate the request to text. The text is then converted to a formatted request based on a set of known preferences.

A connection is established with the transaction processing system. This can be accomplished during, or after the IVB. According to one embodiment, the transaction processing system comprises a remotely located telephone-based transaction site. For example, in the system shown in FIGS. 1–3, call server 18, through the TML parsing engine 1812, establishes a connection with a telephone-based transaction processing site.

According to another embodiment, the transaction processing system comprises a remotely based web-site. According to this embodiment, the formatted request includes a URL to locate the web-site and the system accesses the site through a web connection using the formatted request. Alternatively, the formatted request includes an e-mail address and the system uses any known email program to generate an e-mail request for the transaction.

After the connection is established, the transaction is processed by the transaction processing site and the user is notified of the status of the transaction. If the transaction is completed in real-time, the user may be immediately notified. If the transaction is executed after the IVB, the user may be called again by the system, sent an e-mail, or otherwise notified when the transaction has been completed.

According to one particular embodiment, the system comprises the interactive voice broadcasting system shown and described in FIGS. 1–3 and the transaction is accomplished in real-time. In this embodiment, confirmation of the transaction is returned to TML parsing engine 1812 shown in FIG. 3 and translated to speech in text-to-speech engine 1814 and presented to the user during the IVB. More specifically, and similar to the process described with respect to embedded formatted transaction requests, TML also enables embedding of a response statement. Thus, when the transaction is processed and confirmation of the transaction is returned to the system, an embedded confirmation statement is conveyed to the user through TML parsing engine 1812 after being converted to speech in text-to-speech engine 1814.

Figure 4:
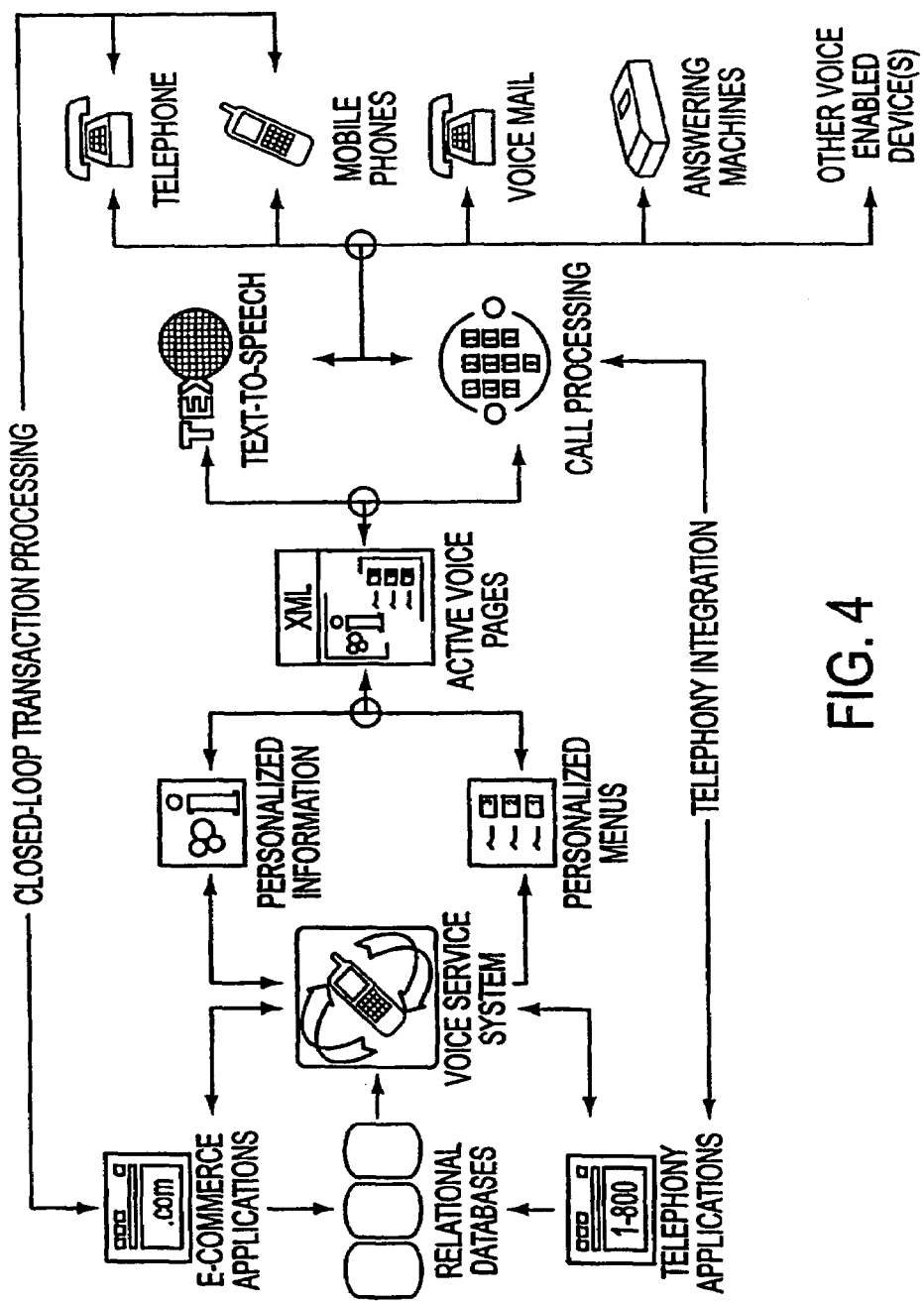
FIG. 4 is a schematic block diagram of a commercial transaction processing system according to an embodiment of the present invention.

FIG. 4 schematically depicts one example of how the system and method of the present invention would fit into such a commercial transaction processing system. Working from left to right in FIG. 4, the system begins and ends with information stored in relational databases. One of the primary purposes of information is in making decisions. Thus, the information in the databases is most useful if provided to someone who desires it in a timely fashion.

A voice service system is provided to enable access to the information in the databases. The voice service system utilizes personalization information and personalized menus to construct AVPs pages that enable the information to be delivered to a user verbally. Moreover, the AVPs pages, not only enable information to be presented to the user. But, they also enable the user to provide information back to the voice service system for additional processing.

According to the embodiment shown in FIG. 4, once the AVPs are constructed by voice service system, they are processed and the content is delivered to a user verbally is in an IVB. Thus, call processing and text-to-speech technology are used to establish a telephone connection with a user and convert the active voice pages to speech for presentation to the user. As shown in FIG. 4, the IVB may be delivered to a user in many devices, including a telephone, a mobile phone, voice mail, an answering machine or any other voice-enabled device.

During the IVB, depending on the content that is being delivered, control may be passed to an e-commerce application for the user to complete a transaction based on the information presented. For example, if the user has requested information about sales on a particular brand of merchandise, the user may be connected with a particular retailer in order to complete a transaction to buy a particular good or service. Information about this transaction is then added to the databases and thus may be advantageously accessed by other users.

It may not be economical for some potential users of a voice broadcasting system to buy and/or maintain their own telephony hardware and software as embodied in call server 18. In such a case, a voice service bureau may be maintained at a remote location to service users voice service requests. A voice service bureau and a method of using a voice service bureau according to various embodiments of the present invention is described in conjunction with FIGS. 5–6.

In one embodiment, a voice service bureau may comprise one or more call servers and call databases that are centrally located and enable other voice service systems to generate a call request and pass the call request to the VSB to execute a call. In this way the other voice service systems do not need to invest in acquiring and maintaining call data bases, call servers, additional telephone lines and other equipment or software. Moreover, the VSB facilitates weeding out usage of illegal numbers and spamming by number checking implemented through its web server.

Figure 5:
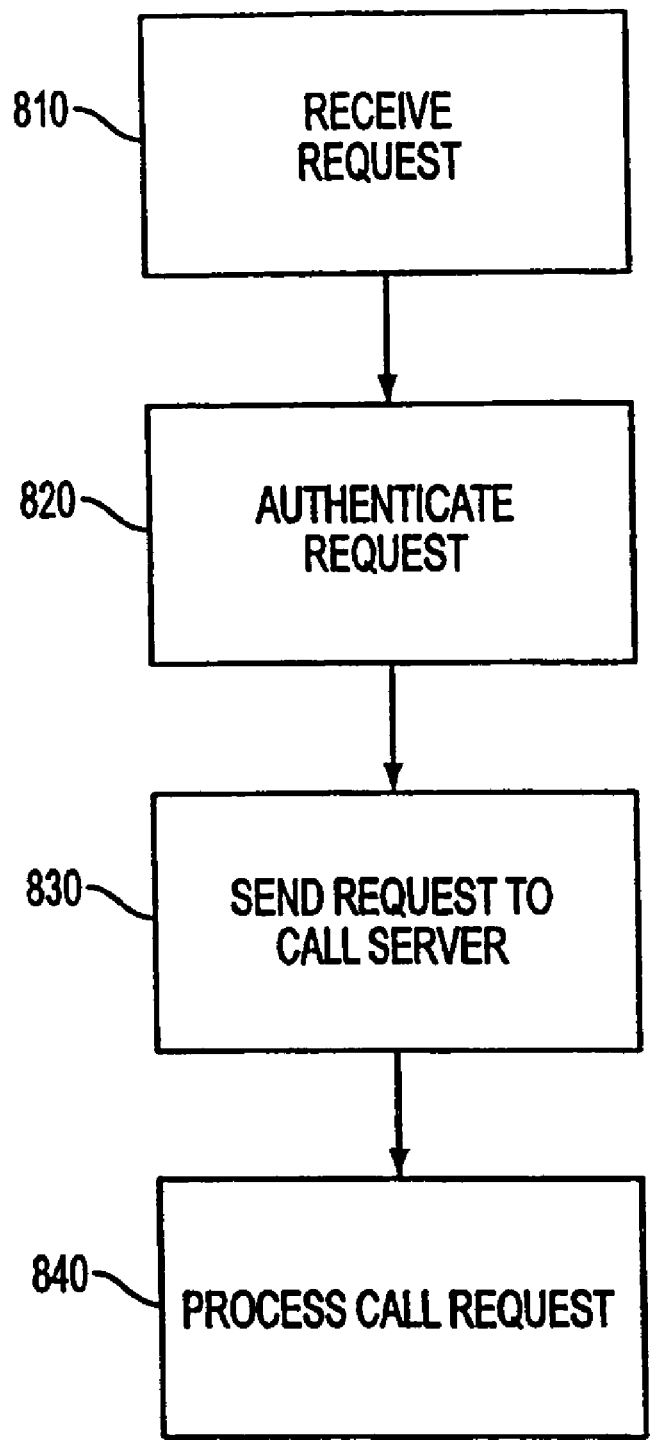
FIG. 5 is a flow chart of a method of using a voice service bureau according to an embodiment of the present invention.

A voice service bureau and a method of using a voice service bureau according to one embodiment are described in conjunction with FIGS. 5–6. FIG. 5 depicts a method of utilizing a voice service bureau according to one embodiment of the present invention. The method begins in step 810 with a request to place one or more telephone calls received through a computer network.

According to one embodiment, the voice service bureau is maintained at a location distant from the voice service system. Therefore, in order for a voice service to be processed by the voice service bureau, in step 810 the voice service is sent to the voice services bureau, preferably over some secure line of communication. According to one embodiment, the request is sent to the voice service bureau through the Internet using secure HTTPS. HTTPS provides a secure exchange of data between clients and the voice service bureau using asymmetric encryption keys based on secure server certificates. In another embodiment, SSL HTTP protocol is used to send a call request to the voice service bureau. Both of these protocols help ensure that a secure channel of communication is maintained between the voice service system and the voice service bureau. Other security techniques may be used.

When a request for a call or telecast is received, by the VSB, the request is authenticated by the voice service bureau in step 820. According to one embodiment, the authenticity of the request is determined in at least two ways. First, it is determined whether or not the request was submitted from a server having a valid, active server certificate. More specifically, requests may be typically received via a stream of HTTPS data Each such request originating from a server with a valid server certificate will include an embedded code (i.e., server certificate) that indicates the request is authentic. In addition to the use of server certificates, each request may also be authenticated using an identification number and password. Therefore, if the request submitted does not include a valid server certificate and does not identify a valid I.D./password combination, the request will not be processed. The step of authenticating also comprises performing any necessary decryption. According to one embodiment, any errors that are encountered in the process of decrypting or authenticating the call request are logged an error system and may be sent back to the administrator of the sending system. Other methods of authenticating the request are possible.

Each properly authenticated request is sent to a call server (step 830) and processed (step 840). According to one embodiment, the voice service bureau comprises a number of call servers. According to one embodiment, the calls are sent to a call database, and processed as set forth herein in conjunction with the explanation of call server 18.

Figure 6A:
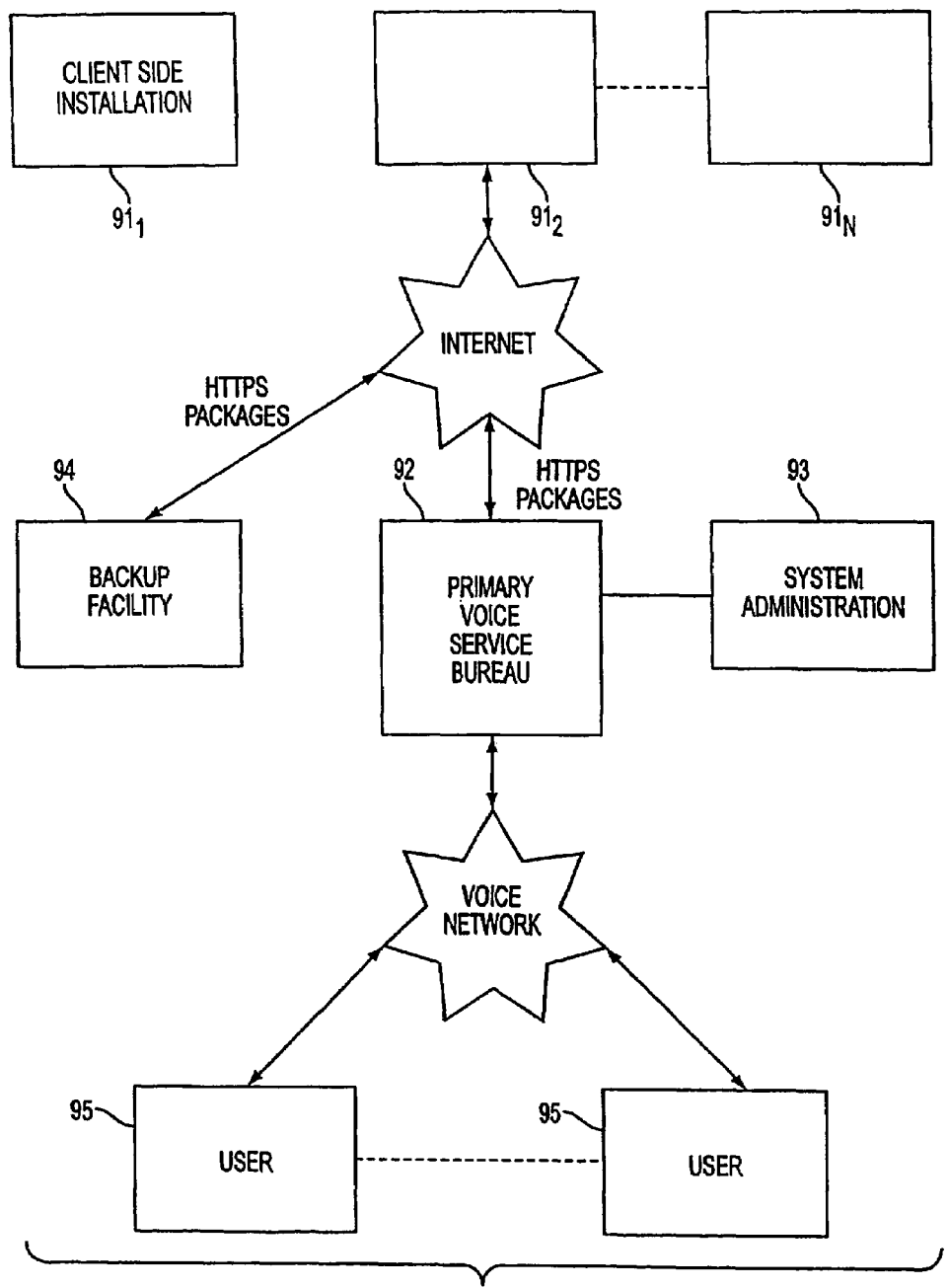
FIG. 6a is a schematic block diagram of a voice service system incorporating a voice service bureau according to one embodiment of the present invention.

One embodiment of a voice service bureau will now be explained in conjunction with FIGS. 6a–6c. FIG. 6a depicts a system comprising a plurality of client side installations 91, a primary voice bureau 92, a system administrator 93, a backup voice service bureau 94, and a plurality of users 95. Client side installations 91 communicate with voice service bureau 92 through a computer network. Voice service bureau 92 communicates with users 95 through a voice network. According to one embodiment, the computer network comprises the internet and client side installations 91 communicate with voice service bureau 92 using HTTPS as described above, and the voice network comprises a public telephone network.

According to one embodiment, client side installations 91 are substantially identical to the system shown in FIG. 4 except for the elimination of call server 18. In the system of FIG. 6a, the functionality of call server 18 is performed by VSB 92. As shown in this embodiment, VSB 92 can service multiple client side installations 91₁ to 91n. According to another embodiment, client-side installation functionality may be included within VSB 92. According to this embodiment VSB 92 constitutes a fully functional voice service that is accessible through email, telephone or other interfaces.

According to this embodiment, when voice services have been assembled by intelligence server 16, a request to have the voice services transmitted is sent via a secure network connection through the computer network shown to primary voice bureau 92 and backup voice service bureau 94 as described above. According to one embodiment, the request comprises a mark-up language string that contains the voice service structure and content and personal style properties and other information. As described above, voice bureau 92 authenticates the request, queues the voice services and sends telecasts to users 95 through the voice network.

Figure 6B:
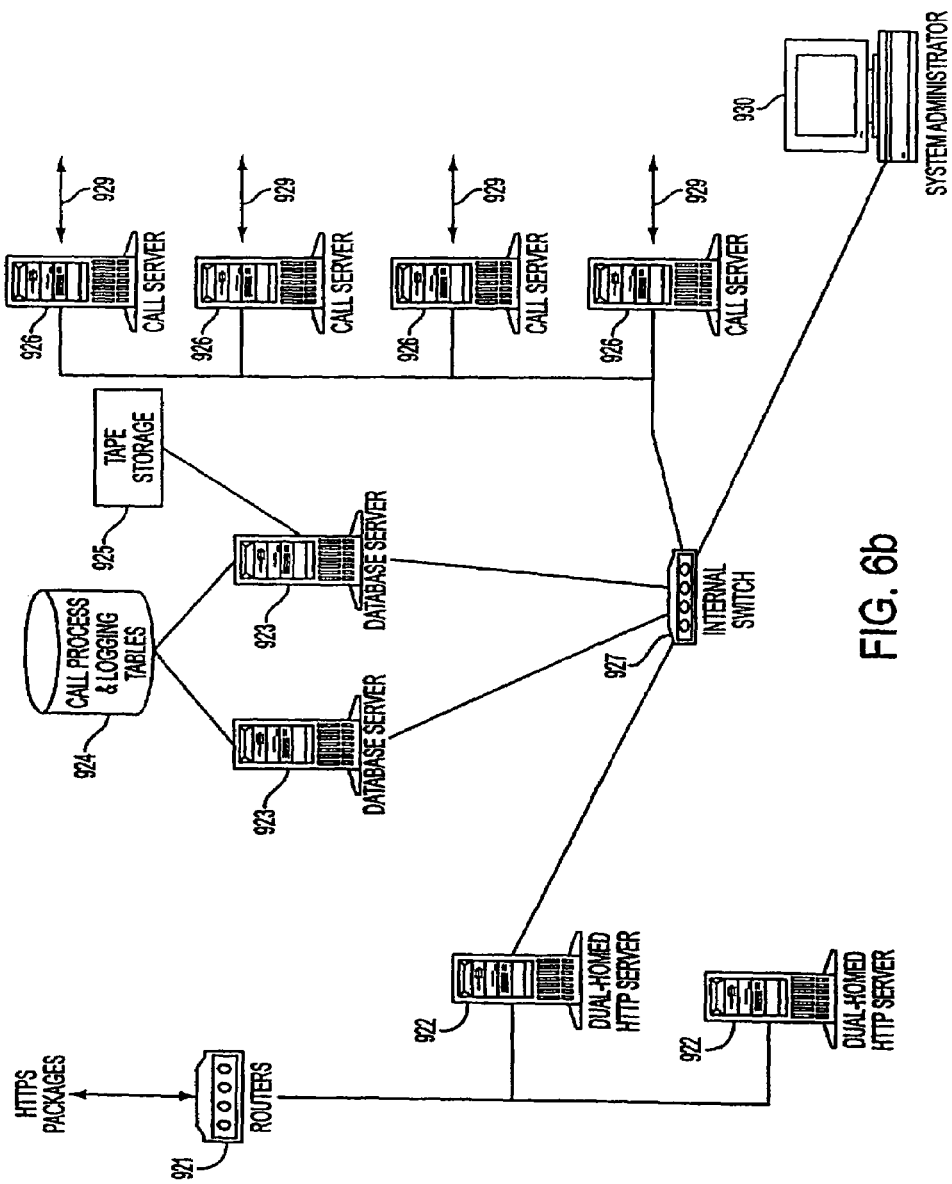
FIG. 6b is block diagram of a primary voice bureau according to one embodiment of the present invention.
Figure 6C:
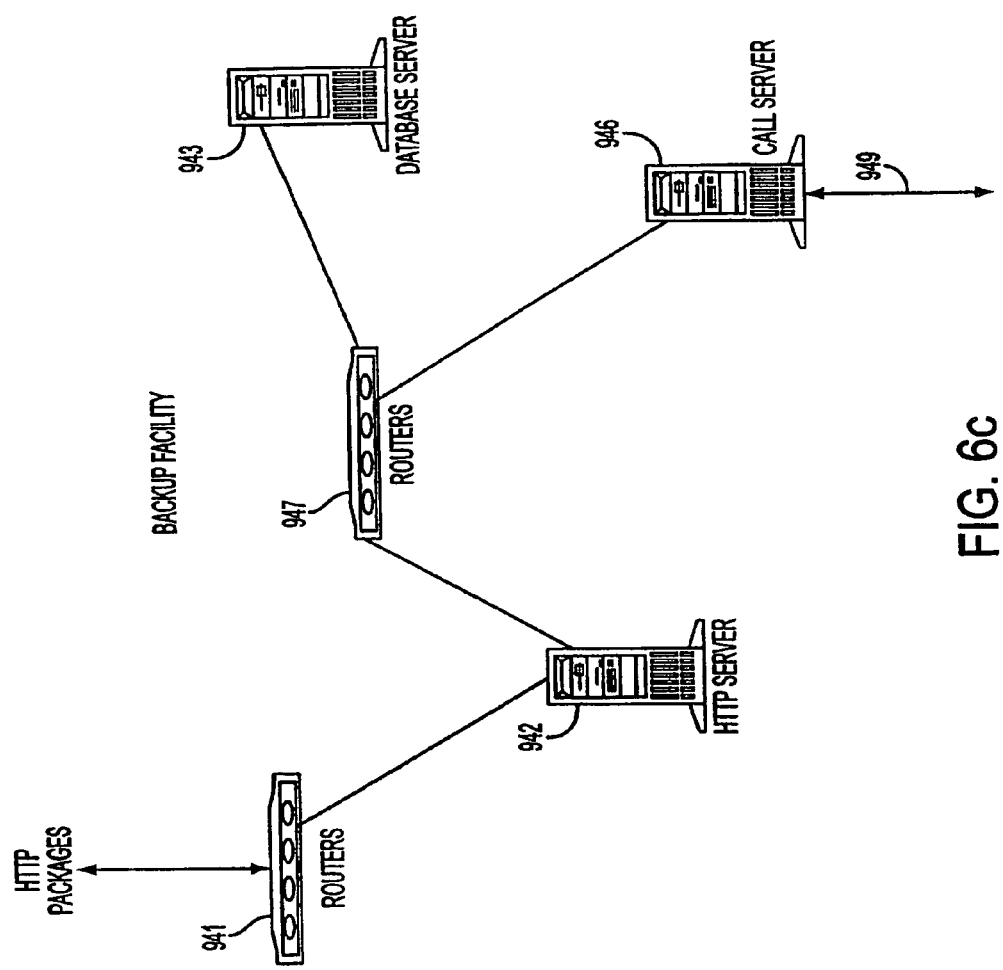
FIG. 6c is a block diagram of a backup voice bureau according to another embodiment of the present invention.

A block diagram of one embodiment of primary voice bureau 92 is shown in FIG. 6b. According to this embodiment, primary voice bureau comprises routers 921, dual-homed servers 922, database servers 923, call database 924, backup storage 925, call servers 926, internal switch 927, and system administrator 93. Routers 921 receive call requests via a computer network and pass them along to one of the two dual-homed servers 922. Router 921 monitors activity on servers 922 and forwards call requests to one of the two depending on availability.

Dual-homed servers 922 comprise servers configured to receive and send HTTPS email. As part of their receiving function, dual-homed servers 922 are configured to perform the authentication processing described above. According to one embodiment, dual-homed servers 922 determine whether the incoming request originated from a server with an active server certificate and also determine if the request contains a valid I.D./password combination. Once dual-homed servers 922 have authenticated the incoming request, they forward the request to be queued in call database 924. As part of their sending function, dual-homed servers 922 are configured to format and send HTTPS email. As discussed above, during a telecast a user may request that further information be accessed from a database or that some transaction be performed. According to one embodiment, these user requests are forwarded back to the originating system via HTTPS email by dual-homed servers 922. Dual-homed servers 922 are load balanced to facilitate optimal performance and handling of incoming call requests.

Database servers 923, call database 924, and backup storage 925 together comprise a call request queuing system. Primary voice bureau 92 is configured to handle a large number of call requests. It may not be possible to process call requests as they arrive. Therefore, call requests are queued in call database 924. According to one embodiment, call database 924 comprises a relational database that maintains a queue of all call requests that need to be processed as well as logs of calls that have been processed. According to another embodiment, primary VSB 92 may include a failover measure that enables another system server to become the call database if call database 924 should fail.

Database servers 923 are configured to control access to call database 924. According to one embodiment, database servers may be optimized to generate SQL statements to access entries in call database at high speed. Database servers 923 also control storage of call requests and call logs in call database 924.

Call servers 926 each are configured to format and send telecasts. According to one embodiment, each of call servers 926 is substantially identical to call server 18 shown in FIG. 3c. More specifically, each of call servers 926 receives requests for telecasts, parses the call content from the mark-language, establishes a connection with the user through phone lines 929, and receives user responses. According to one embodiment, call servers 926 comprise a clustered architecture that facilitates message recovery in the event of server failure.

Primary voice bureau 92 is controlled by system administrator 93 and internal switch 927. System administrator controls switch 927 and thus controls the flow of call requests to call database 924 from dual homed servers 922 and to call servers 926 from call database 924.

System administrator 93 is also configured to perform a number of other services for primary voice bureau 92. According to one embodiment, system administrator 93 also comprises a billing module, a statistics module, a service module and a security module. The billing modules tabulates the number of voice service requests that come from a particular user and considers the billing plan that the customer uses so that the user may be appropriately billed for the use of voice bureau 92. The statistics module determines and maintains statistics about the number of call requests that are processed by voice bureau 92 and statistics regarding call completion such as, e.g., success, failed due to busy signal and failed due to invalid number. These statistics may be used, for example, to evaluate hardware requirements and modify pricing schemes. The security module monitors activity on voice bureau 92 to determine whether or not any unauthorized user has accessed or attempted to access the system. The service module provides an interface through which primary voice bureau 92 may be monitored, for example, to determine the status of call requests. Other service modules are possible. Moreover, although these services are described as distinct modules, their functionality could be combined and provided in a single module.

Backup voice service bureau 94 receives a redundant request for voice services. Backup voice service bureau 94 processes the requests only when primary voice service bureau is offline or busy. One embodiment of backup voice service bureau 94 is shown in FIG. 6c. Backup voice bureau 94 comprises routers 941, HTTP server 942, database server 943, call server 946 and routers 947. Each of these components performs a function identical to the corresponding element in primary voice bureau 92. Router 947 replaces switch 927. Communication lines 949 may replace phone lines 929. Router 947 controls the forwarding of call requests to database server 943 for queuing in an internal database, and the forwarding of call requests to call server 946 from database server 943.

The systems and methods discussed above are directed to outbound broadcasting of voice services. Nevertheless, in certain situations, for example when the out bound telecast is missed, it is desirable to for a voice service system to enable inbound calling. According to another embodiment, a method and system for providing integrated inbound and outbound voice services is disclosed.

Figure 7:
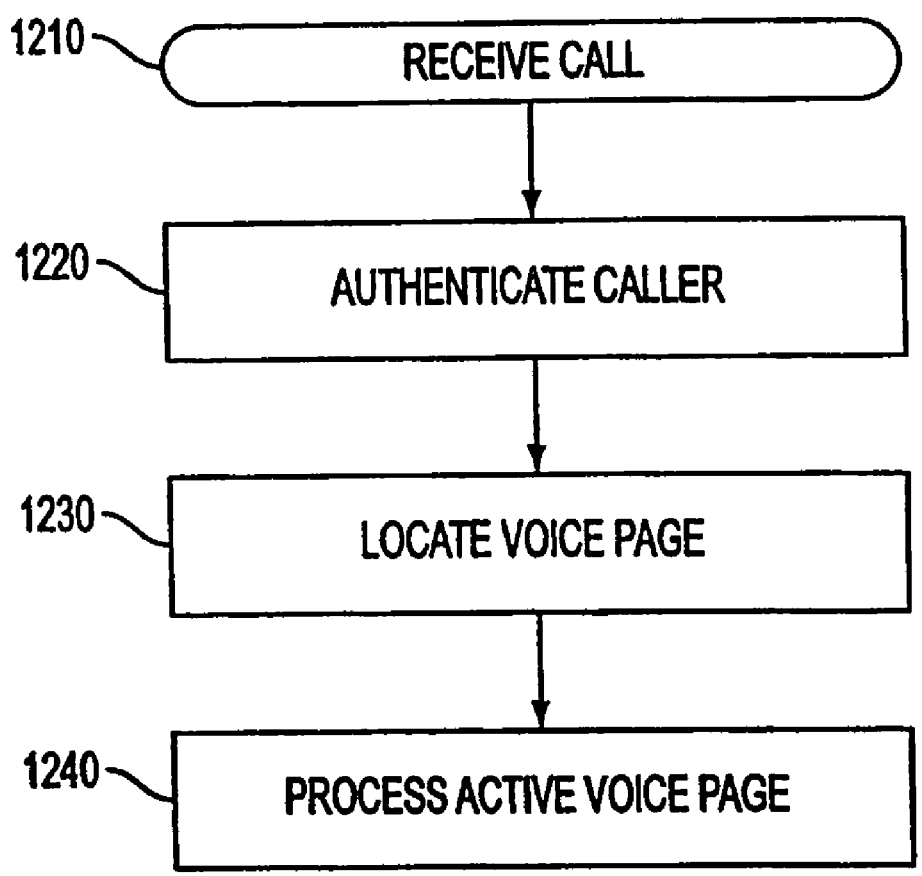
FIG. 7 is a flow chart illustrating a method for integrating inbound and outbound voice services.

A method for providing inbound access to voice services according to one embodiment of the present invention is shown in FIG. 7. According to FIG. 7, the method begins with receipt of a call requesting voice services in step 1210. To help ensure system integrity and to prevent unauthorized access, a call request is authenticated in step 1220. According to one embodiment, each incoming caller is automatically prompted to enter a login identifier and a PIN. According to another embodiment, an automatic number identification system is used, in addition to a login identifier and PIN system, to determine whether or not the user is calling from an authorized device. According to another embodiment, speaker recognition technology is utilized to identify a caller. According to this embodiment, voice prints for each user of the voice service system are stored as identifiers. When an inbound call is connected, pattern matching techniques are used verify the user's speech against the previously stored voice prints. Other security measures are possible.

In step 1230, a voice page is located. As explained above, a telecast of a voice service is driven by an active voice page. Accordingly, a user calling in to access voice services locates the desired active voice page. According to one embodiment, the user is automatically placed into an active voice page of a voice service that the user missed. That is, the system chooses an active voice page that it was unable to deliver. According to this embodiment, when a call is undeliverable (e.g., when an answering machine picks up), the active voice page for that call is placed in memory in a "voice site" table or as an active voice page on a web site and addressed using the user's identification. When the user calls in to retrieve the voice service, after the user logs in, the table or web site will be searched for an active voice page that corresponds to their identification. If such a page exists, it is executed by the call server.

Other possibilities exist for accessing active voice pages through inbound calling. According to another embodiment, the system maintains a log of all voice services sent and provides an inbound user an option to select one of their previous voice services. According to another embodiment, an inbound caller is automatically placed into an active voice page that presents the user with an option to select one of that user's most frequently used services. According to still another embodiment, the user is allowed to search for past active voice pages by date or content. For example, the user may be prompted to enter a date on or near which the desired voice page was executed. According to another embodiment, the user may use the telephone keys to enter a search term and search the content of any previously executed active voice page that they are authorized to access or that is not secure.

Once an active voice page is located, the user navigates through the active voice page in step 1240. As described above, a user navigates through an active voice by exercising options, responding to prompts and otherwise entering input to the system. An inbound calling system would thus have access to the full functionality of the voice service system described in conjunction with FIGS. 16.

Figure 8:
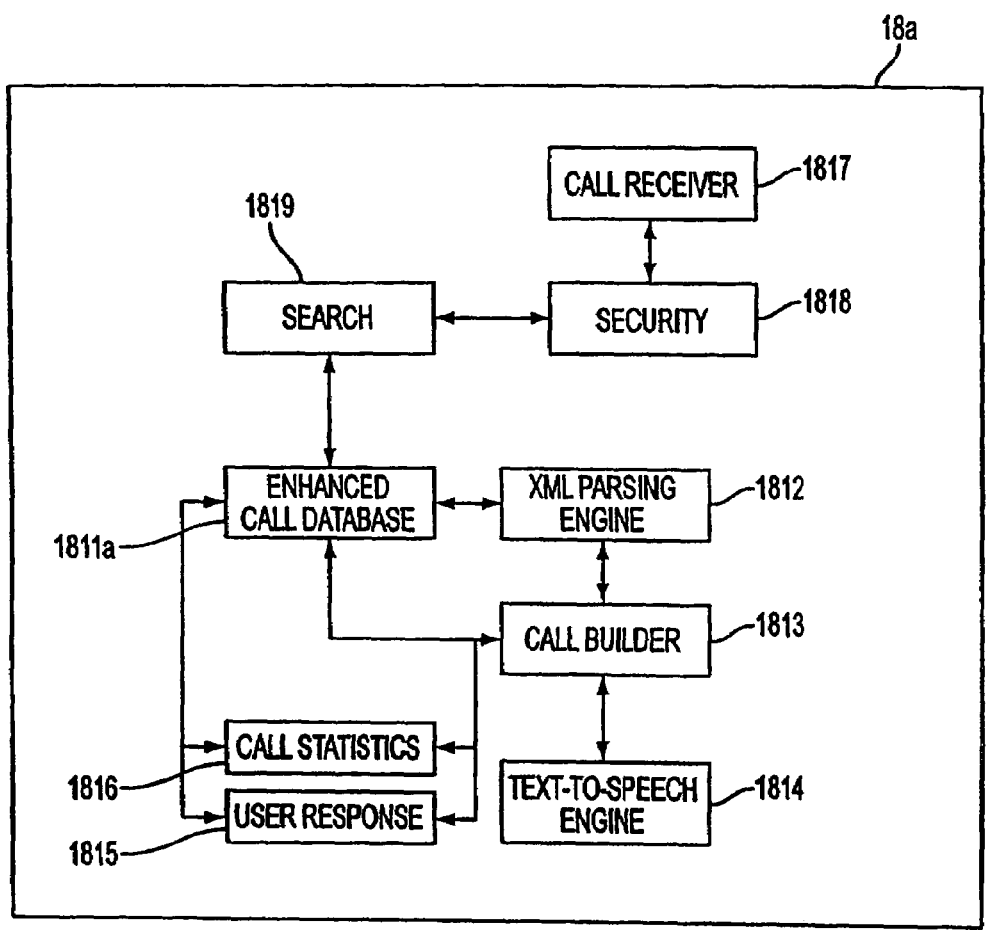
FIG. 8 is a block diagram of a call server configured to provide integrated inbound and outbound voice services.

FIG. 8 depicts a block diagram of a call server 18a that enables integrated inbound and outbound calling. In addition to the modules depicted in call server 18 of FIG. 3, call server 18a comprises call receiver module 1817, security module 1818 and search module 1819. Moreover, in the system for permitting inbound and outbound calling, call database 1811 has been replaced with an enhanced call database 1811a.

In order to receive inbound calls, call server 18a comprises call receiver module 1817. Although, call server 18 discussed above contains hardware permitting reception of calls as well as transmission of calls, it is not set up to receive calls. Call receiver module 1817 enables call server 18a to receive calls and routes the incoming calls to security module 1818. According to one embodiment, call receiver module comprises a software component designed to configure call server 18a to receive calls. Other embodiments are possible.

Received calls are forwarded to security module 1818 for authentication. According to one embodiment discussed above, incoming calls are authenticated using login I.D.'s and passwords. According to another embodiment, automatic number identification software is used to identify and authenticate callers. According to another embodiment, speech recognition and pattern matching techniques are used to identify a caller.

Authenticated calls may search for an active voice page using search module 1819. According to one embodiment, search module 1819 comprises a search engine designed specifically to search active voice pages. According to one embodiment discussed above, active voice pages utilize an XML-based language and search module 1819 comprises an XML-based search engine. According to another embodiment, search module 1819 comprises a SQL engine designed to make queries against a relational or other type of database.

The active voice pages that are being search are stored in enhanced call database 1811a. In addition to its facilities to queue and log calls, enhanced call database 1811 includes facilities to catalog active voice pages. According to one embodiment, enhanced call database comprises a relational or other type of database. According to this embodiment, enhanced call database is used to store and categorize active voice pages and corresponding parameters, such as expiration dates for active voice pages. Other storage facilities are possible.

Various features and functions of the present invention extend the capabilities of previously known information delivery systems. One such system is MicroStrategy's Broadcaster version 5.6. The features and functions of the present invention are usable in conjunction with Broadcaster and other information delivery systems or alone. Other products may be used with the various features and functions of the invention including, but not limited to, MicroStrategy's known product suite.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A method for providing interactive, real-time, voice transmission of information, and for enabling follow-up querying, comprising:

enabling at least one subscriber to subscribe to at least one voice service that can output information derived from an on-line analytical processing (OLAP) system;

generating output from the OLAP system for the at least one subscriber when a predetermined condition has been satisfied;

formatting the OLAP output into one or more markup documents personalized for the at least one subscriber;

initiating an outbound voice-enabled communication to the at least one subscriber;

delivering the OLAP output from the one or more personalized markup documents to the at least one subscriber during the voice-enabled communication;

enabling the at least one subscriber to generate at least one query during the voice-enabled communication in response to the OLAP output presented from the one or more personalized markup documents; and processing the at least one query.

2. The method of claim 1, further comprising processing the at least one query in real-time during the voice-enabled communication.

3. The method of claim 1, wherein the predetermined condition comprises at least one of a triggering event, or a scheduled event.

4. The method of claim 3, wherein the predetermined condition is specified by at least one of an administrator, or the at least one subscriber.

5. The method of claim 1, wherein the outbound voice-enabled communication comprises a telephone communication.

6. The method of claim 1, wherein enabling the at least one subscriber to subscribe to the at least one voice service further comprises enabling the at least one subscriber to specify preferences for the content and presentation of the OLAP output.

7. The method of claim 1, wherein enabling the at least one subscriber to generate at least one query further comprises requesting input from the at least one subscriber based on the OLAP output presented from the one or more personalized markup documents.

8. The method of claim 7, wherein requesting input comprises prompting the at least one subscriber for an input.

9. The method of claim 7, wherein requesting input comprises presenting the at least one subscriber with one or more options to choose from.

10. The method of claim 1, wherein enabling the at least one subscriber to generate at least one query further comprises enabling the at least one subscriber to complete a query embedded in the one or more personalized markup documents.

11. The method of claim 1, wherein enabling the at least one subscriber to generate at least one query further comprises enabling the at least one subscriber to access a transaction request based on information in the one or more personalized markup documents.

12. The method of claim 1, wherein enabling the at least one subscriber to generate at least one query further comprises enabling the at least one subscriber to access a transaction request using a link in the one or more personalized markup documents.

13. The method of claim 1, wherein the one or more personalized markup documents comprise one or more active voice pages.

14. The method of claim 1, wherein the at least one query comprises a database query.

15. The method of claim 1, wherein the at least one query comprises a query for the OLAP system.

16. The method of claim 1, wherein processing the at least one query comprises providing the at least one query to a database system to be searched.

17. The method of claim 1, wherein processing the at least one query comprises sending an electronic message including the at least one query to a database system to be searched.

18. The method of claim 1, wherein processing the at least one query comprises providing the at least one query to an Internet web site to be searched.

19. A system for providing interactive, real-time, voice transmission of information, and for enabling follow-up querying, comprising:
- means for enabling at least one subscriber to subscribe to at least one voice service that can output information derived from an on-line analytical processing (OLAP) system;
- means for generating output from the OLAP system for the at least one subscriber when a predetermined condition has been satisfied;
- means for formatting the OLAP output into one or more markup documents personalized for the at least one subscriber;
- means for initiating an outbound voice-enabled communication to the at least one subscriber;
- means for delivering the OLAP output from the one or more personalized markup documents to the at least one subscriber during the voice-enabled communication;
- means for enabling the at least one subscriber to generate at least one query during the voice-enabled communication in response to the OLAP output presented from the one or more personalized markup documents; and
- means for processing the at least one query.

20. The system of claim 19, wherein the at least one query is processed in real-time during the voice-enabled communication.

21. The system of claim 19, wherein the predetermined condition comprises at least one of a triggering event, or a scheduled event.

22. The system of claim 21, wherein the predetermined condition is specified by at least one of an administrator, or the at least one subscriber.

23. The system of claim 19, wherein the outbound voice-enabled communication comprises a telephone communication.

24. The system of claim 19, further comprising means for enabling the at least one subscriber to specify preferences for the content and presentation of the OLAP output while subscribing to the at least one voice service.

25. The system of claim 19, wherein the means for enabling the at least one subscriber to generate at least one query further comprises means for requesting input from the at least one subscriber based on the OLAP output presented from the one or more personalized markup documents.

26. The system of claim 25, wherein the means for requesting input comprises means for prompting the at least one subscriber for an input.

27. The system of claim 25, wherein the means for requesting input comprises means for presenting the at least one subscriber with one or more options to choose from.

28. The system of claim 19, wherein the means for enabling the at least one subscriber to generate at least one query further comprises means for enabling the at least one subscriber to complete a query embedded in the one or more personalized markup documents.

29. The system of claim 19, wherein the means for enabling the at least one subscriber to generate at least one query further comprises means for enabling the at least one subscriber to access a transaction request based on information in the one or more personalized markup documents.

30. The system of claim 19, wherein the means for enabling the at least one subscriber to generate at least one query further comprises means for enabling the at least one subscriber to access a transaction request using a link in the one or more personalized markup documents.

31. The system of claim 19, wherein the one or more personalized markup documents comprise one or more active voice pages.

32. The system of claim 19, wherein the at least one query comprises a database query.

33. The system of claim 19, wherein the at least one query comprises a query for the OLAP system.

34. The system of claim 19, wherein the means for processing the at least one query comprises means for providing the at least one query to a database system to be searched.

35. The system of claim 19, wherein the means for processing the at least one query comprises means for sending an electronic message including the at least one query to a database system to be searched.

36. The system of claim 19, wherein the means for processing the at least one query comprises means for providing the at least one query to an Internet web site to be searched.

* * * * *

UNITED STATES PATENT AND TRADEMARK OFFICE
CERTIFICATE OF CORRECTION

PATENT NO. : 6,977,992 B2  Page 1 of 1
APPLICATION NO. : 10/951475
DATED : December 20, 2005
INVENTOR(S) : Michael Zirngibl et al.

It is certified that error appears in the above-identified patent and that said Letters Patent is hereby corrected as shown below:

<u>Title page,</u>
Item [56], References Cited, U.S. PATENT DOCUMENTS, add:
-- 6,067,348  05/23/00  Hibbeler
   6,067,535  05/23/00  Hobson et al.
   6,078,924  06/20/00  Ainsbury et al.
   6,078,994  06/20/00  Carey
   6,081,815  06/27/00  Spitznagel et al.
   6,094,651  07/25/00  Agrawal et al.
   6,094,655  07/25/00  Rogers et al.
   6,101,241  08/08/00  Boyce et al.
   6,101,443  08/08/00  Kato et al.
   6,101,473  08/08/00  Scott et al.
   6,108,686  08/22/00  Williams, Jr.
   6,115,686  09/05/00  Chung et al.
   6,115,693  09/05/00  McDonough et al.
   6,119,095  09/12/00  Morita
   6,122,628  09/19/00  Castelli et al.
   6,122,636  09/19/00  Malloy et al.
   6,131,184  10/10/00  Weeren et al.
   6,134,563  10/17/00  Clancey et al.
   6,151,582  11/21/00  Huang et al.
   6,151,601  11/21/00  Papierniak et al.
   6,154,527  11/28/00  Porter et al.
   6,154,766  11/28/00  Yost et al.
   6,157,705  12/05/00  Perrone --.

Signed and Sealed this

Twentieth Day of June, 2006

JON W. DUDAS
*Director of the United States Patent and Trademark Office*